United States Patent [19]
Toba

[11] Patent Number: 5,993,041
[45] Date of Patent: Nov. 30, 1999

[54] PRODUCTION CONTROLLER FOR FACILITY GROUP WORK START

[75] Inventor: Hiroyasu Toba, Tokyo, Japan

[73] Assignee: NEC Corporation, Tokyo, Japan

[21] Appl. No.: 08/982,044

[22] Filed: Dec. 1, 1997

[30] Foreign Application Priority Data

Nov. 29, 1996 [JP] Japan .................................. 8-334974

[51] Int. Cl.$^6$ .............................. G06F 19/00; G06G 7/66
[52] U.S. Cl. ................................. 364/468.05; 364/468.06
[58] Field of Search ......................... 364/468.05, 468.06, 364/578; 705/8

[56] References Cited

U.S. PATENT DOCUMENTS

| | | | |
|---|---|---|---|
| 4,870,592 | 9/1989 | Lampi et al. ....................... | 364/468.19 |
| 5,093,794 | 3/1992 | Howie et al. ...................... | 364/468.06 |
| 5,369,570 | 11/1994 | Parad .......................................... | 705/8 |
| 5,521,828 | 5/1996 | Ueda ................................. | 364/468.12 |
| 5,559,710 | 9/1996 | Shahraray et al. ................. | 364/468.06 |
| 5,748,478 | 5/1998 | Pan et al. ........................... | 364/468.05 |
| 5,764,543 | 6/1998 | Kennedy ................................. | 364/578 |

FOREIGN PATENT DOCUMENTS

| | | |
|---|---|---|
| 5-12298 | 1/1993 | Japan . |
| 6-251028 | 9/1994 | Japan . |
| 6-266728 | 9/1994 | Japan . |
| 7-129672 | 5/1995 | Japan . |
| 8-161394 | 6/1996 | Japan . |
| 8-179808 | 7/1996 | Japan . |
| 9-45596 | 2/1997 | Japan . |
| 10-15788 | 1/1998 | Japan . |

OTHER PUBLICATIONS

B.R. Tibbits, "Flexible simulation of a complex semiconductor manufacturing line using a rule–based system", *IBM J. Res. Develop.*, vol. 37, No. 4, pp. 507–521, Jul. 1993.

Henry D'Angelo, et al., "Even–driven model of unreliable production lines with storage", *Int. J. Prod. Res.*, vol. 26, No. 7, pp. 1173–1182, 1988.

Vassilis S. Kouikoglou, et al., "An Exact Discrete–Event Model and Control Policies for Production Lines with Buffers", *IEEE Transactions On Automatic Control*, vol. 36, No. 5, pp. 515–527, May 1991.

Hishashi Tamaki, et al., "Modeling of Job–shop Scheduling Problem with In–process Buffer Capacity" *T. SICE*, vol. 31, No. 7, pp. 933–940, Jul. 1995.

*Primary Examiner*—William Grant
*Assistant Examiner*—McDieunel Marc
*Attorney, Agent, or Firm*—Foley & Lardner

[57] ABSTRACT

For enabling a execute of work start scheduling based on individual lot attributes, a production controller controls includes a lot schedule managing section for managing a first work estimate schedule for each of lots existing in finite buffer facility groups continuous in a working procedure, a facility schedule managing section for managing an operation stopping estimate schedule and a second work estimate schedule for each of facilities of the continuous finite buffer facility groups, and a buffer schedule managing section for managing a utilization estimate schedule for each of the finite buffer facility groups. With reference to the first work estimate schedule, the operation stopping estimate schedule, the second work estimate schedule, and the utilization estimate schedule, a continuous process scheduling section carries out scheduling of the lots put in a continuous zone of the continuous finite buffer facility groups. With reference to the third work estimate schedule, a progress control section controls execution of the work relative to the lots arrived at the finite buffer facility groups.

6 Claims, 26 Drawing Sheets

FIG. 3

LOT1234

LOT SCHEDULE TIME TABLE T1211

| PRO-CESS | FACIL GP | FACIL | ARRIVAL TIME | START TIME | RELEASE TIME | FINISH TIME |
|---|---|---|---|---|---|---|
| RG01 | RG1 | M10001 | 0 | 1000 | 5000 | 5000 |
| RG02 | RG2 | M20003 | 6000 | 6500 | 8000 | 9000 |
| RG03 | RG3 | M30002 | 9100 | 9200 | 10000 | 10100 |
| RG04 | RG4 | M40002 | 10200 | 11000 | 11500 | 11900 |
| RG05 | RG5 | M50005 | 11900 | 12000 | 14000 | 14000 |
| RG06 | RG6 | M60003 | 14100 | 14100 | 21000 | 23000 |
| RG07 | RG7 | M70001 | 23000 | 23100 | 23200 | 23200 |
| RG08 | RG8 | M80004 | 23200 | 23700 | 24800 | 24800 |
| RG09 | RG9 | M90005 | 25000 | 30000 | 31000 | 31000 |
| RG0A | RGA | MA0004 | 31200 | 32000 | 33000 | 34000 |

SCHEDULING CONTINUES, WHILE FINITE BUFFER FACILITY GROUPS CONTINUE, FROM A PROCESS WHERE MAKING OF A SCHEDULE IS STARTED.

(A)

LOT1234 LOT SCHEDULE TIME TABLE T1211

| PRO-CESS | FACIL GP | FACIL | ARRIVAL TIME | START TIME | RELEASE TIME | FINISH TIME |
|---|---|---|---|---|---|---|
| RGO2 | RG2 | M20003 | 6000 | 6500 | 8000 | 9000 |

(B)

(C) RG2-STOCKER2 BUFFER SCHEDULE TIME TABLE T1213

| TIME | STAY AMOUNT |
|---|---|
| 1000 | 3 |
| 1500 | 4 |
| 5000 | 3 |
| 5150 | 2 |
| 5200 | 1 |
| 5600 | 2 |
| 5650 | 3 |
| 5700 | 2 |
| 5950 | 1 |
| 6000 | 2 |

PRODUCTION CONTROLLER FOR FACILITY GROUP WORK START

BACKGROUND OF THE INVENTION

The present invention relates to a production controller and, in particular, to a production controller which controls a lot flow of a production line including a plurality of production facility groups so as to control the work start such that the number of lots waiting for the work before the corresponding facility group does not exceed the capacity of a corresponding buffer (keeping shelf) which stores the waiting lots.

In a production system, the work on a lot is carried out by using resources, such as facilities, workers and jigs. These resources have their own working capabilities and are used based on individual operation plans. Lots to be processed are fed daily to the production system, and the production system starts the work on the lots based on the predetermined working procedure using the working resources of the production system.

In the production line comprising a plurality of facility groups, a lot which arrived at the facility group of a certain process and was subjected to the work is transferred to the facility group of the next process. In this case, if the capacity of the facility group where the lot has arrived is sufficient, the work on the lot is immediately started in that facility group. On the other hand, if the capacity of that facility group is not sufficient, the transferred lot queues up before the facility group and waits for the work.

Accordingly, depending on a relationship between the capacity of each of the facility groups and the lot feed plan, a fair number of waiting lots may be waiting before each of the facility groups. For storing these waiting lots, the production line is normally provided with keeping shelves of various sizes, that is, buffers, at the respective facility groups.

In general, the buffer has a limitation in its capacity (kind of working resource). Accordingly, in the production control system, it is necessary to carry out a lot progress control to manage the amount of the process lots so as not to exceed the buffer capacities at all the facility groups.

Conventionally, in some production lines, when the number of the waiting lots is likely to exceed the buffer capacity, provisional keeping shelves are prepared to temporarily accommodate the waiting lots by workers.

However, for example, in a production line for large liquid-crystal panels, since the size of the liquid-crystal panel and further the weight thereof are large, it is difficult for the worker to handle the panels per unit of a lot. Therefore, automation of the production lines has been advanced. Further, in view of idle space or layout of the production line, it is difficult to provide space for provisional keeping shelves or provide large-capacity buffers for keeping a large amount of the lots. Accordingly, it is desired that the work start for a lot at each of the facilities is automatically controlled so that the number of the waiting lots at the facility group of the next process does not exceed the buffer capacity, predetermined per facility group, during the work in the facility or the transfer work.

Various methods have been proposed for automation of the lot flow control of the production line, for example, as described in Japanese Unexamined Patent Publication No. 5-12298 which aims to realize an efficient lot flow for those lots having a high working priority by obtaining data even about lots which are scheduled to reach the facility group of the current process from the facility group of the prior process. On the other hand, for example, Japanese Unexamined Patent Publication No. 7-129672 has proposed a production control method for controlling the actual work progress to follow the target feed amount.

On the other hand, with respect to the lot flow control of the production line considering the buffer capacity, for example, about the system for controlling the work start by observing work waiting lots at the next process facility group, a modeling example of the flow control using a rule-based system is shown in literature (1) (B. R. Tibbitts: "Flexible simulation of a complex semiconductor manufacturing line using a rule-based system", IBM J. RES. DEVELOP. Vol. 37, No. 4, July 1993, pp. 507 to 521). In this flow control model, the flow control of a kanban system is realized between the continuous facility groups by means of (1) a lot start control toward the next process facility group and (2) a lot start control from the prior process facility group.

Further, in literature (2) (Henry D'Angelo, Michael Carmanis, Susan Finger, Anton Marvretic, Yannis A. Phillis, Edward Ramsden: "Event-driven model of unreliable production lines with storage", INT. J. PROD. RES., 1988, Vol. 26, No. 7, 1173–1182) and literature (3) (Vassilis S. Kouikoglou, Yannis A. Phillis: "An Exact Discrete-Event Model and Control Policies for Production Lines with Buffers", IEEE Trans on Automatic Control, Vol. 36, No. 5, 1991, pp. 515 to 527), a capability evaluation technique for the production system under BC control is described. With a view to capability evaluation and without explicitly modeling a lot to be processed, attention is paid to time points of the state changes of the facilities and the buffers, and the number of the process lots in each facility is derived from a workable time of the facility and a facility throughput so as to realize the capability evaluation. Specifically, the control of the buffer level is indirectly realized through adjustment of the facility throughput. Further, calculation of time of buffer block occurrence is carried out in advance based on the throughput, and the throughput adjustment and update of the facility state and the buffer state for buffer level control and work start control are carried out upon occurrence of facility maintenance, failure and buffer block relative to the facility groups prior to and subsequent to the occurrence of the state change, and further, the work lot is derived based on a time segment of the state change and the throughput.

Further, Japanese Unexamined Patent Publication No. 8-179808 (Patent Application No. 6-320310) describes as prior art a flow control using a condition represented by the following formula (1) as a work start criterion for assuring that the number of the waiting lots of the next process facility group does not exceed the buffer capacity.

Assuming that a buffer capacity of a next process facility group $RG_{i+1}$, while a current process facility group being $RG_i$, is set as $S_{i+1}$, the number of work waiting lots of $RG_{i+1}$ at a time t is set as $N_{i+1}(t)$, a facility group which can be a prior process facility group relative to $RG_{i+1}$ is set as $RGprevO_{i+1}^j$, and the number of lots whose next process is $O_{i+1}$ among the process lots at $RGprevO_{i+1}^j$ is set as $NprevO_{i+1}^j$ (t), the formula (1) is given by $$S_{i+1} \geq N_{i+1}(t) + \sum_j N_{prevO_{i+1}}^j(t) \qquad (1)$$

Further, the foregoing Japanese Patent Application No. 6-320310 describes as prior art a device for an automatic lot flow control based on the estimated amount of process lots, wherein the number of lots to be accommodated in a buffer is limited.

Further, Japanese Patent Application No. 7-214160 describes a device for a lot flow control based on the estimated amount of process lots, wherein no buffer is provided.

Further, for considering the buffer, the scheduling method shown in the foregoing Japanese Patent Application No. 6-320310 may be combined with the conventional technique shown in the foregoing Japanese Patent Application No. 7-214160.

On the other hand, with respect to scheduling of the production line considering the buffer capacity, in literature (4) (Hisashi Tamaki, Yoshikazu Nishikawa "Modeling of Job-shop Scheduling Problems with In-process Buffer Capacity", Metrology Automobile Institute Thesis, 1995, Vol. 31, No. 7, pp. 933 to 940), the scheduling problem considering the buffer capacity is formulated as a mixed integer programming problem and substituted for the selection graph model, the time Petri net or the Gantt chart model.

In the foregoing literature (4), with respect to the Gantt chart model, a method is referred to, wherein, assuming that a maximum value of a time at which one or more lots are put in an immediately-before buffer is set as t1, a time at which room is caused in an immediately-after buffer is set as t2, and a time at which a facility to be used becomes idle is set as t3 (if undetermined, set to ∞, respectively), scheduling is carried out by deriving an earliest processable time segment defined by an earliest startable time max (t1, t2, t3) satisfying $$\max(t1, t2, t3) < \infty$$

and an earliest finishable time.

However, the foregoing conventional lot flow control methods under the finite buffer capacity limitation have the following problems, respectively:

In the conventional production control methods aiming at the automation of the lot flow control of the production line as proposed in the foregoing Japanese Unexamined Patent Publications Nos. 5-12298 and 7-129672, the lot flow control considering the buffer capacity limitation of each of the facility groups is not carried out.

Accordingly, if such a conventional lot flow control is applied to the production line having the finite capacity buffers, it is difficult to suppress an occurrence of the waiting lots within the capacity of each buffer. For this reason, the current state that the lot flow control in the production line does not rely on the automation, but is carried out manually, and thus, the automation of the production control as an expected target can not be realized.

Further, if the conventional kanban system flow control shown in the literature (1) "Flexible simulation of a complex semiconductor manufacturing line using a rule-based system" is applied, since the work start is notified to the prior process after room is caused in the buffer, a time lag corresponding to a work time in the prior process facility group is caused until a lot subjected to the work start in the prior process facility group finally fills the buffer. Particularly, when the work time in the prior process facility is long, the lot work number per unit time is reduced so that the control for smoothly advancing the work becomes difficult.

Further, in the conventional methods shown in the literature (2) "Event-driven model of unreliable production lines with storage" and the literature (3) "An Exact Discrete-Event Model and Control Policies for Production Lines with Buffers", the process model is used wherein one process (facility group) includes one facility. Accordingly, for dealing with the problems of the general production lines where one process (facility group) includes a plurality of facilities in which the throughput differs per facility or the maintenance term differs per facility, it is necessary to adjust the throughput and change the handling of the maintenance term, the failure term and the like per unit of facility group. As a result, these conventional methods can not be used advantageously as they are.

Further, in these conventional methods, no consideration is given to a time for post-arrangement work which does not bind the facility after the work start, and a time for lot transfer to the next process, which are frequently observed in the general production lines. The existence of the post-arrangement work time and the lot transfer time causes a time lag between he throughput adjustment in the facility groups and the actual change in number of lots in buffers. As a results, since the accurate number of the work lots can not be calculated, the proper number of lots in buffer can not be estimated so that the flow control as an expected target can not be realized.

Further, for speeding up the process, the work objects (lots) on the production line are not explicitly modeled, and the number of the work lots is derived through calculations. Thus, attributes (kind, work condition, work priority, and so forth) of the individual lots applied to the actual flow control can not be considered.

There has been a problem that, in the prior art which does not aim at the flow control, the flow control of the work lots as an expected object can not be accomplished.

Further, in the conventional flow control method shown as the prior art in the foregoing Japanese Patent Application No. 6-320310, for satisfying the buffer capacity limitation of the next process, the sum of the number of waiting lots at the next process buffer and the number of lots in process scheduled to arrive at the next process buffer is regarded as a lot feed amount of the next process buffer, and the work start in the current process facility is determined so as to hold this lot feed amount within the next process buffer capacity.

Although this work start determination method assures that the next process buffer capacity is followed, the lot feed amount tends to be estimated greater than the actual lot stay amount in the buffer. For example, in the state that the next process buffer capacity is not greater than the number of facilities of the facility group prior thereto, even if the process capacity of the next process facility group is high so as not to cause a lot stay in the buffer, the number of the lots to be processed in the prior process facility group is limited to not greater than the next process buffer capacity. Thus, although the next process buffer actually has room for a further lot so that the work is executable, there is a high possibility that the work start is reserved.

As a time period from the lot work start in the prior process facility group to the arrival of the lot at the next process facility group becomes longer, a time period (time lag) for which the new work start is suppressed increases so that execution of the lot feed control for smoothly advancing the work becomes difficult.

As a result, the facilities are operated at the production capacity lower than the actual production capacity. Accordingly, at the facility group where a work time is long, the number of lots waiting for the work inevitably increases so that the buffer capacity is reached in due course to reserve even the work in the prior process facility group, and finally, the work progress of the whole system is stagnated.

Further, in the prior art shown in the foregoing Japanese Patent Application No. 6-320310, the lot flow control is realized, wherein the work start control is carried out based on the estimated amount of the process lots in the next process facility group so as to utilize the next process buffer capacity. However, in this prior art, when the number of the facility groups to which the same control is continuously applied in the working procedure becomes not less than three, there is a possibility that the work start can not be estimated subsequent to the third facility group.

For example, it is possible to determined upon the work start in the first facility group based on only the buffer state of the second facility group and the state of the usable facility of the second facility group that the work start can be carried out. Upon the work start in the second facility group, the work start is determined based on the buffer state of the third facility group and the state of the usable facility of the third facility group. Similarly, the work start in the third facility group is determined by the states of the fourth facility group, and the work start in the fourth facility group is determined by the states of the fifth facility group. Accordingly, the work start in the i-th facility group is determined by the states of the (i+1)-th facility group.

As a result, when the facility groups having the finite buffers continue, it is necessary to carry out the work start in the facility groups within the continuous zone by knowing the states of all the facility groups in the continuous zone subsequent to the work start process and satisfying the finite buffer limitation in the respective facility groups.

If the foregoing conventional technique is applied to the production line in which three or more facility groups have the finite buffers continue, since the work start in the second facility group is carried out without considering the states of the third or subsequent buffer, the number of the staying lots exceeds the buffer capacity of the corresponding facility group so that the control following the buffer capacity, as an expected target, can not be accomplished. Specifically, when the work start control is applied to the zone with three or more continuous processes, scheduling for following the buffer capacities in the continuous process zone can not be ensured only based on the conventional work start determination for the facility groups.

Further, when the conventional technique described in the foregoing Japanese Patent Application No. 7-214160 is applied to the flow control of the production line having the buffers, the work start control is carried out without using the buffers of the respective facility groups so that the control following the buffer capacity, as an expected target, can not be accomplished. Moreover, since the work start is suppressed when the scheduling can not be achieved for the facility group to which the control is continuously applied, the number of the work reports is reduced to lower the production efficiency.

Further, if the conventional scheduling method described in the foregoing Japanese Patent Application No. 6-320310 is applied to the device described in the foregoing Japanese Patent Application No. 7-214160, the operation time periods of all the facilities and the buffer capacity are fully utilized in a first generated bottle neck facility group among the continuous process facility groups to which the control is applied.

However, after the occurrence of the bottle neck state, the buffer of the facility group of a process prior to a process of the bottle neck facility group is subjected to change without being utilized, the control following the buffer capacity, as an expected target, can not be accomplished thereby to lower the production efficiency.

If the scheduling shown in the literature (4) "Modeling Technique of Scheduling Problem Considering Buffer Capacity" is applied to the production control, it is necessary, in the conventional method based on the mixed integer programming problem, to solve the mixed integer programming problem per execution of the work in real time, and thus it may be not practical.

In the literature (4), in the conventional technique based on the scheduling method shown in the Gantt chart model, assuming that a maximum value of a time at which one or more lots are put in an immediately-before buffer is set as t1, a time at which room is caused in an immediately-after buffer is set at t2, and a time at which a facility to be used becomes idle is set as t3 (if undetermined, set to $\infty$, respectively), the scheduling is carried out by deriving an earliest processable time segment defined by an earliest startable time max (t1, t2, t3) satisfying max (t1, t2, t3)<$\infty$ and an earliest finishable time. Accordingly, the occurrence of the time lag due to the work start control in the continuous facility groups can be avoided. However, since the scheduling is carried out utilizing only the local data, that is, the work start facility group and the next process facility group thereof, when the work start control is applied to the finite buffer facility groups continuing over three or more processes, even if the work start is determined based on the scheduling method in which the earliest processable time segment is derived, the scheduling for following the buffer capacities in the continuous processes can not be accomplished as in the foregoing Japanese Patent Application No. 6-320310 so that the control following the buffer capacity, as an expected target, can not be realized.

In many of the foregoing conventional techniques, the work start control is carried out only by the local data about the prior and subsequent process facility groups. Accordingly, for example, if a chain of the work start suppression occurs due to the work start control, it is essentially difficult to escape from the situation of the work complete stop or the like due to a deadlock of the work progress. Specifically, in many of the conventional techniques carrying out the work start control based on the local data, the work start control based on the large-regional data over the facility groups of several processes necessary for avoiding the deadlock is not carried out so that the deadlock state of the work progress tends to be caused.

SUMMARY OF THE INVENTION

It is therefore an object of the present invention to provide a production controller which is capable of controlling the work start in each of facilities of facility groups of continuous processes so as to satisfy a limitation such that the number of lots waiting for work before the corresponding facility group is held within a buffer capacity of the corresponding facility group, and executing work start scheduling based on individual lot attributes utilizing facility capacities without excessively suppressing the work start in the facility groups of the continuous processes.

It is another object of the present invention to provide a production controller of the type described, which is capable of advancing the work in the facility groups of the continuous processes while reliably avoiding a deadlock.

Other objects of this invention will become clear as the description proceeds.

According to one aspect of the present invention, there is provided a production controller comprising a progress control means for controlling execution of work, based on a lot work estimate schedule predetermined by scheduling, relative to a lot arrived at each of finite buffer facility groups where the number of lots to be accommodated in a corresponding buffer is limited, and for controlling work to be executed next, based on a predetermined facility schedule, relative to a lot to be processed next in a facility which has finished a lot process; a lot schedule managing means for storing and managing, for each of the lots existing in the finite buffer facility groups continuous in a working procedure, a work estimate schedule in the continuous finite buffer facility groups; a facility schedule managing means for storing and managing an operation stopping estimate schedule and a work estimate schedule for each of facilities of the continuous finite buffer facility groups; a buffer schedule managing means for storing and managing a buffer utilization estimate schedule for each of the finite buffer facility groups; and a continuous process scheduling means for making, relative to a lot entering a continuous zone of the continuous finite buffer facility groups or a lot whose work estimate schedule is undetermined from the midway in the continuous zone, an undetermined work schedule for the lot in the continuous zone or a schedule for the lot to indefinitely stay on the midway, the work start in each of the facilities of the facility groups in the working procedure being controlled so as to satisfy a limitation such that the number of the lots waiting for the work before the corresponding facility group is held within a buffer capacity of the corresponding facility group.

According to another aspect of the present invention, there is provided a production controller for controlling a lot flow of a production line including a plurality of finite buffer facility groups so as to control the work start such that the number of lots waiting for work before the corresponding facility group does not exceed a capacity of a corresponding buffer which stores waiting lots, the production controller comprising a lot schedule managing means for storing and managing in a storage section, for each of the lots existing in the finite buffer facility groups continuous in a working procedure, a work estimate schedule in the continuous finite buffer facility groups; a facility schedule managing means for storing and managing in the storage section an operation stopping estimate schedule and a work estimate schedule for each of facilities of the continuous finite buffer facility groups; a buffer schedule managing means for storing and managing in the storage section a buffer utilization estimate schedule for each of the finite buffer facility groups; a continuous process scheduling means for making, relative to a lot entering a continuous zone of the continuous finite buffer facility groups or a lot whose work estimate schedule is undetermined from the midway in the continuous zone, all the undetermined work schedule for the lot in the continuous zone or a schedule for the lot to indefinitely stay on the midway; a progress control means for controlling execution of work, based on the lot work estimate schedule predetermined by the continuous process scheduling means, relative to a lot arrived at each of the finite buffer facility groups where the number of the lots to be accommodated in a corresponding buffer is limited, and for controlling work to be executed next, based on the predetermined facility schedule, relative to a lot to be processed next in the facility which has finished a lot process; and a schedule correcting means for, upon occurrence of a discrepancy between the schedule made by the continuous process scheduling means and an actual schedule, correcting the discrepancy of the made schedule according to the actual schedule.

According to still another aspect of the present invention, there is provided a production controller comprising lot schedule managing means for managing a first work estimate schedule for each of lots existing in finite buffer facility groups continuous in a working procedure, facility schedule managing means for managing an operation stopping estimate schedule and a second work estimate schedule for each of facilities of the finite buffer facility groups, buffer schedule managing means for managing a utilization estimate schedule for each of the finite buffer facility groups, continuous process scheduling means connected to the lot schedule managing, the facility schedule managing, and the buffer schedule managing means for scheduling, with reference to the first work estimate schedule, the operation stopping estimate managing means for scheduling, with reference to the first work estimate schedule, the operation stopping estimate schedule, the second work estimate schedule, and the utilization estimate schedule, a third work estimate schedule for the lots put in a continuous zone of the finite buffer facility groups, and progress control means connected to the continuous process scheduling means for controlling, with reference to the third work estimate schedule, execution of the work relative to the lots arrived at the finite buffer facility groups.

BRIEF DESCRIPTION OF THE DRAWING

FIG. 3 is a diagram for explaining the first preferred embodiment and showing an example of a lot schedule time table which is used by a work start control section and a scheduling section for scheduling, per lot, a work progress in a finite buffer facility group and a time of arrival at a buffer;

DESCRIPTION OF THE PREFERRED EMBODIMENTS

Preferred embodiments of the present invention will be described hereinbelow in detail with reference to the accompanying drawings.

Figure 1:
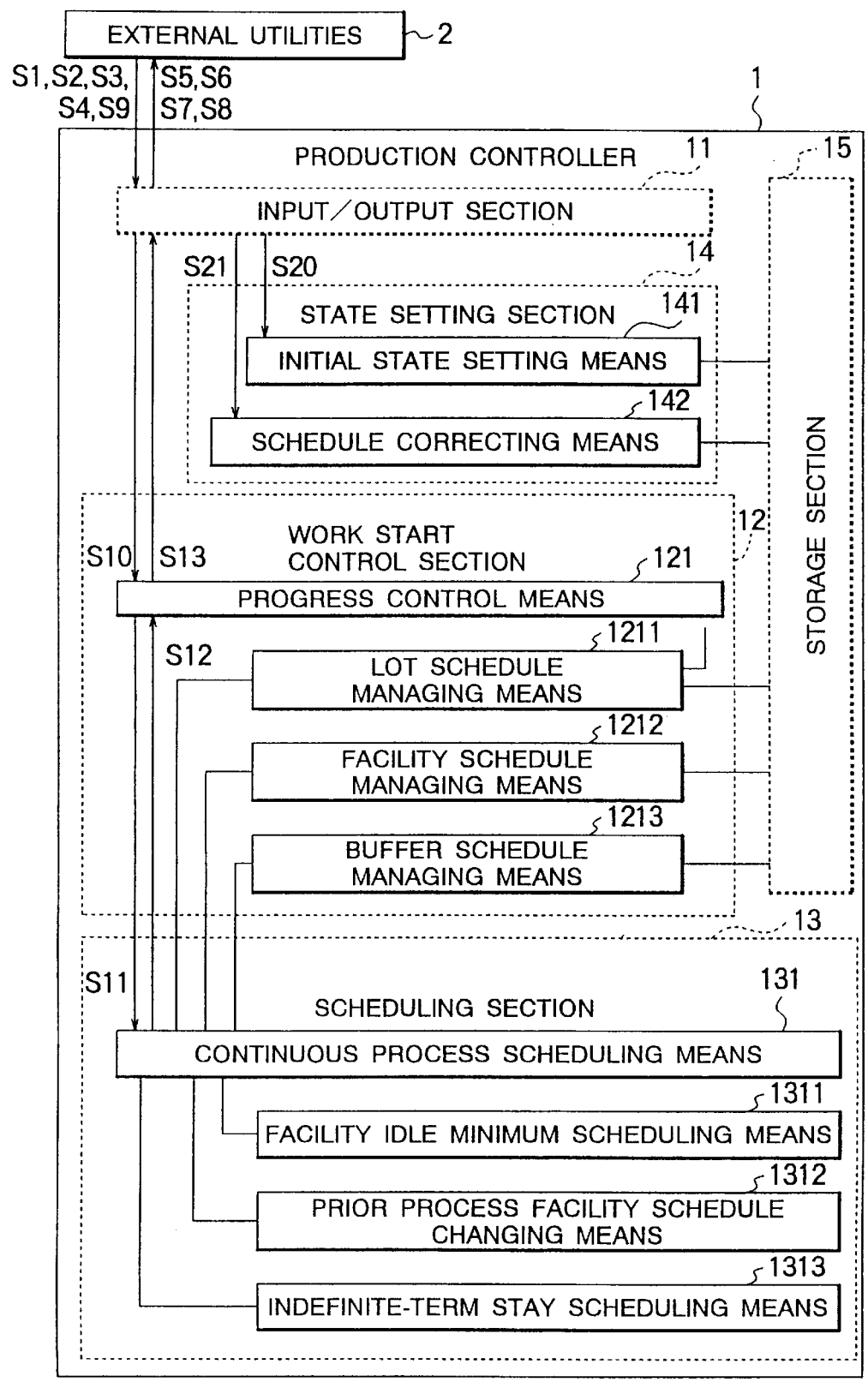
FIG. 1 is a block diagram showing a structure of a production controller according to a first preferred embodiment of the present invention.

FIG. 1 is a block diagram showing a structure of a production controller 1 according to the first preferred embodiment of the present invention. Referring to FIG. 1, the production controller 1 comprises an input/output section 11 for inputting/outputting data, such as request signals and control signals, via transmission lines relative to external utilities 2 provided external of the production controller 1. The external utilities 2 include a device for controlling facility groups each in the form of an assemblage of production facilities of the same kind, a device for controlling the facilities, the facilities, a device for controlling buffers which accommodate therein work waiting lots for the corresponding facility groups, respectively, the buffers, and so forth. The production controller 1 further comprises a work start control section 12 for controlling the work start for the lots to be processed in the respective facilities and the utilization of the buffers in the finite buffer facility groups where the amounts of the lots to be accommodated in the buffers are limited, respectively. The production controller 1 further comprises a scheduling section 13 for carrying out lot work scheduling for the respective facilities and buffer utilization scheduling, and a state setting section 14 for obtaining production planning data and production line data from the external utilities 2 and executing various setting processes. The production controller 1 further comprises a storage section 15 for storing stay schedules of the lots which stay in the buffers of the finite buffer facility groups, facility schedules including the maintenance of the facilities and the like, schedules, such as lot work schedules, the lots, the working procedures, and so forth.

The work start control section 12 includes a progress control means 121 for controlling, in response to a work start request of a lot for the work in the facility which has reached the facility group, implementation of the work based on a lot work estimate schedule which has been predetermined by the scheduling section 13 and is referred to as a third work estimate schedule, and for controlling, in response to a work start request from the facility which has finished the lot processing, the work to be carried out next based on a facility schedule which has been predetermined.

The section 12 further includes a lot schedule managing means 1211 for storing in the storage section 15 a first work estimate schedule in the finite buffer facility groups which are continuous in the working procedure, for each of the lots existing in those continuous finite buffer facility groups, and managing it per lot.

The section 12 further includes a facility schedule managing means 1212 for storing in the storage section 15 an operation stopping estimate schedule and a second work estimate schedule for each of the facilities of the continuous finite buffer facility groups, and managing them per facility.

The section 12 further includes a buffer schedule managing means 1213 for storing in the storage section 15 a buffer utilization estimate schedule for each of the facility groups having the finite buffers, respectively, and managing it per facility group.

The scheduling section 13 includes a continuous process scheduling means 131 for making, relative to a lot entering a continuous zone of the finite buffer facility groups which are continuous in the working procedure or a lot whose work estimate schedule is undetermined from a midway point in the continuous zone, all the undetermined work schedule for the lot in the continuous zone or a schedule for the lot to indefinitely stay on the midway based on a facility idle minimum scheduling means 1311, a prior process facility schedule changing means 1312 and an indefinite-term stay scheduling means 1313.

The section 13 further includes the facility idle minimum scheduling means 1311 for selecting a work facility and a work time which minimize an idle stopping period of each production facility.

The section 13 further includes the prior process facility schedule changing means 1312 for changing a work time segment in the prior process facility group to a work time segment where the work can be carried out after a designated time.

The section 13 further includes the indefinite-term stay scheduling means 1313 for indefinitely staying the lot in the designated facility group.

The state setting section 14 includes an initial state setting means 141 which obtains production planning data, production line data, data about lots for process and so forth from the external utilities 2 upon initial operation and makes and sets a lot schedule time table T1211 after a production control start time per lot in initial process, a facility schedule time table T1212 per facility and a buffer schedule time table T1213 per buffer for setting the controller to be ready for executing the production control.

The section 14 further includes a schedule correcting means 142 for correcting discrepancies between the actual schedules and the estimated schedules according to the actual schedules.

Characters S1 to S9 shown in FIG. 1 represent examples of signals transmitted and received between the production controller 1 and the external utilities 2 via the input/output section 11.

S1 is an initial setting request control signal notifying parameters indicative of an initial state, a production plan and so forth of the production line to be controlled by the production controller;

S2 is a buffer arrival work start request control signal for notfying an arrival of a lot at each of the buffers in the continuous zone of the finite buffer facility groups which are continuous in the working procedure and are to be controlled by the production controller 1, and requesting the work start;

S3 is a facility work start request control signal for notifying completion of the work in the facility of each of the facility groups in the continuous zone and requesting the work start;

S4 is a schedule change request control signal notified from the external utilities 2 when a change occurs in the facility work schedule, the facility operation stopping estimate schedule, the bufffer utilization schedule or the like in the continuous zone, and S9 is astate setting request control signal notified from the external utilities 2 when a change occurs in the state of the production line, the production plan or the like.

The signals S1–S4 and S9 are the data inputted into the production controller 1.

On the other hand, S5 to S8 are data outputted from the production controller 1.

S5 is a work start command control signal sent to each of the facility groups in the continuous zone;

S6 is a work start reserve control signal sent to each of the facility groups in the continuous zone;

S7 is a data request control signal sent to the external utilities 2; and

S8 is a schedule change control signal responsive to the schedule change request control signal S4 for notifying the changed schedule contents to the exterior of the controller.

Although various other data are inputted and outputted via the input/output section 11, they are omitted in FIG. 1.

Characters S10 to S13, S20 and S21 represent examples of signals transmitted and received between the elements in the production controller 1.

S10 is a work start request control signal which is notified upon request of the lot work start from the input/output section 11 to the progress control means 121;

S11 is a scheduling request control signal which is notified upon request for making a lot work schedule from the input/output section 11 to the scheduling section 13, S12 is a scheduling completion signal notified from the scheduling section 13 to the progress control means 121 of the work start control section 12 that the schedule has been made;

S13 is a progress control completion signal from the progress control means 121 to the input/output section 11 notifying that the work progress control has been completed;

S20 is an initialization request control signal notified from the input/output section 11 to the state setting section 14 upon reuqest for initial setting of production control parameters; and S21 is a schedule correction request control singal notifying a correction request of the schedule to the state setting section 14 when the change of the estimate schedule is requested from the external utilities 2.

Hereinbelow, the overall operation of the production controller 1 and the functions of the respective components will be explained.

Figure 2:
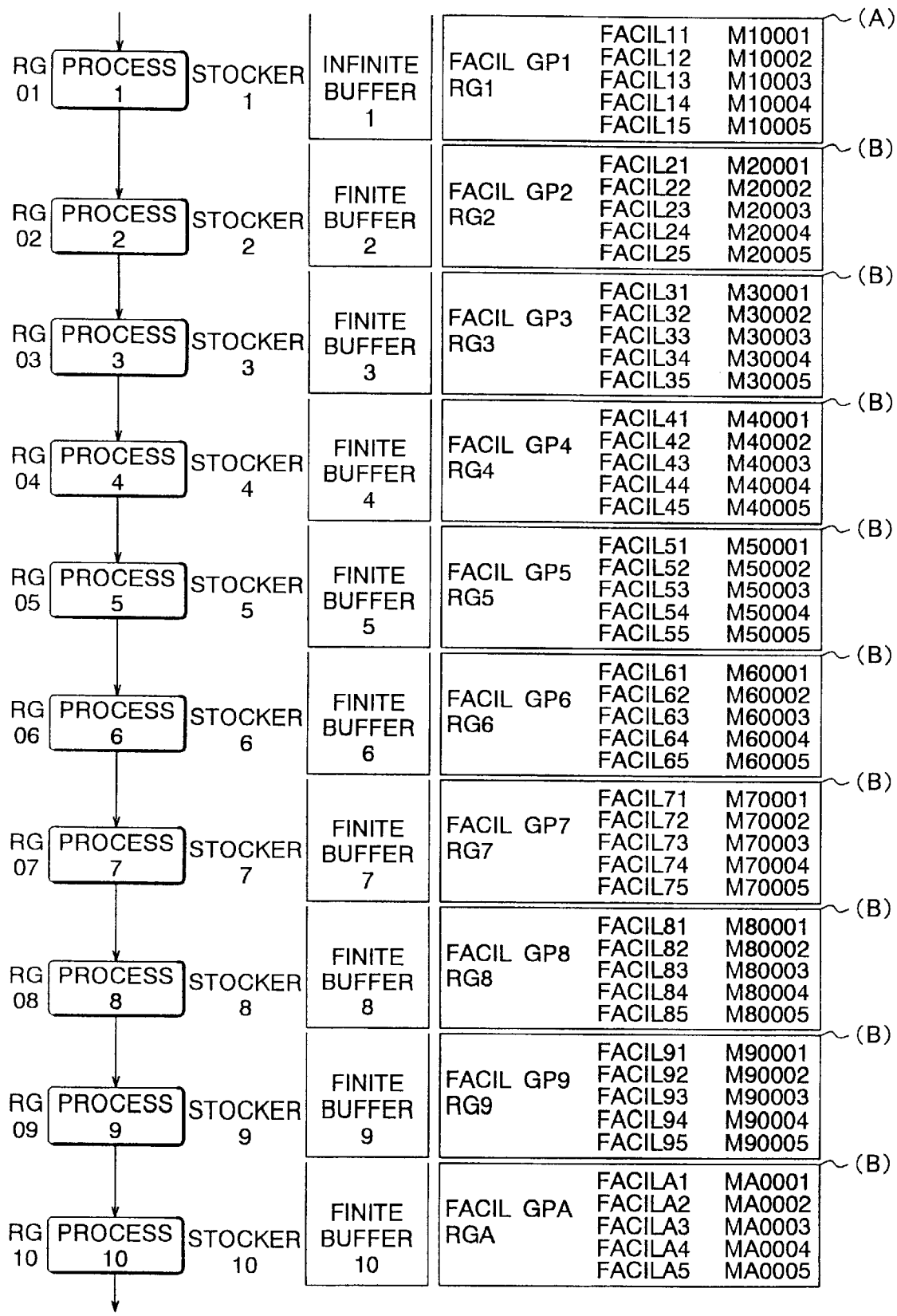
FIG. 2 is a diagram showing an example of a production system used for explaining an operation of the first preferred embodiment.

First, for facilitating explanation, FIG. 2 shows an example of a production line which is an object to be controlled by the production controller 1 and includes finite buffer facility groups.

Referring to FIG. 2, the production line includes facility groups 1 to 10, wherein the facility group 1 includes facilities 11 to 15, the facility group 2 includes facilities 21 to 25, and similarly, the facility groups 3 to 10 each include five facilities.

The facility group 1 is provided with an infinite buffer 1 having no limitation to the buffer capacity, while the subsequent facility groups 2 to 10 are provided with finite buffers 2 to 10 having limitation to the buffer capacity, respectively.

The production line has processes 1 to 10 corresponding to the facility groups 1 to 10, respectively.

Relative to a lot put into the production line, the work is started in the facility group corresponding to the first process in the working procedure, that is, the facility group 1, using the facilities belonging to the facility group 1, and then carried out in the subsequent facility groups in order according to the working procedure. The lot arrived at each facility group is temporarily stored in the corresponding buffer. If the facility group at which the lot is arrived is (I) a facility group having an infinite buffer and carrying out a prior process relative to a facility group having a finite buffer, or (II) a facility group having a finite buffer, the production controller 1 executes a lot flow control.

In FIG. 2, the facility group 1 satisfies the condition (I), while the facility groups 2 to 10 satisfy the condition (II), respectively.

Now, an initial operation of the production controller 1 will be explained. The production controller 1 obtains, as data about the production line to be controlled, by the initial state setting means 141 of the state setting section 14 at the start of operation, production control parameters, such as product data about lots to be processed in the production line, working procedure data, process data, data about facility groups and facilities, buffer data, facility stopping data, work time data in the facilities, a dispatching rule of the facilities and an assigning rule of the facilities, data about lots in process, in a process waiting state and on transfer, and data about lot feed plan and so forth from the external utilities 2 via the input/output section 11, and stores and manages them in the storage section 15.

If these production data managed outside the production controller 1 change, the contents of the change are notified to the production controller 1 by means of the state setting request control signal S9 so that the production data stored in the storage section 15 is constantly updated to the new contents.

FIG. 3 shows an example of a lot schedule time table T1211 which is used by the work start control section 12 and the scheduling section 13 for scheduling, per lot, a work progress in the finite buffer facility group and a time of arrival at the buffer.

The lot schedule time table T1211 is stored in the storage section 15 per lot. The lot schedule time table T1211 shown in FIG. 3 refers to lot data about lot name LOT1234.

Refeerring to FIG. 3, the time table T1211 is a collection of records composed of a name of each of processes corresponding to the continuous facility groups, a name of each of the facility groups, a name of each of the facilities scheduled to carry out the work, an arrival time per lot at the corresponding facility, a start time per work, a release time per work and a finish time per work.

In the time table T1211,

"arrival time" represents an estimated time of arrival of a lot at each of the processes which is calculated upon making a lot schedule based on a standard facility bind time and a standard work time in each of the facilities of the facility group of each process;

"start time" represents an estimated time at which the work is started in the facility group of each process;

"release time" represents an estimated time at which the facility is released in the facility group of each process; and "finish time" represents an estimated time at which the work is finished in the facility group of each process.

Referring to FIG. 3, a work schedule of the lot LOT1234, for example, in the process RG02 at the facility group RG2 is such that the lot arrives at time 6000, the work is started by the facility M20003 at time 6500, the facility is released at time 8000, and the work is finished at time 9000.

Figure 4:
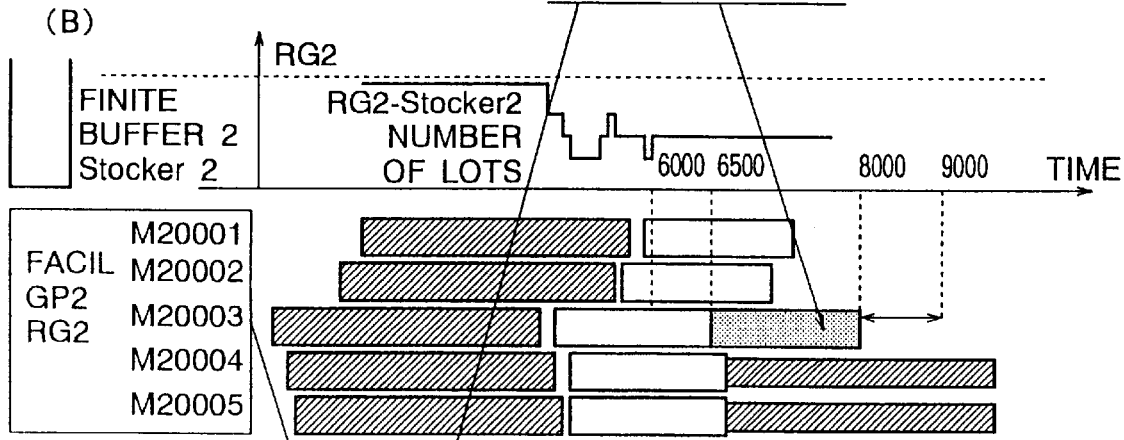
FIG. 4 is a diagram for explaining the first preferred embodiment and showing an example of a facility schedule time table which is used upon making a facility utilization schedule.

FIG. 4 shows an example of a facility schedule time table T1212 which is used upon making a facility utilization schedule. The time table T1212 is stored in the storage section 15 per facility.

Referring to FIG. 4, the time table T1212 is referred to from facility data about facility name M20003. The time table T1212 is a collection of records composed of a start time and a release time.

In the time table T1212,

"start time" represents an estimated time at which the utilization of the facility is expected to be disabled due to stopping of the facility or the estimated work start in the facility; and "release time" represents an estimated time at which the facility is expected to be released due to the termination of the facility stop.

Referring to FIG. 4, in the time table T1212 of, for example, the facility M20003, a facility bind start time by the lot LOT1234 is 6500 and a facility release time by the lot LOT1234 is 8000.

Figure 5:
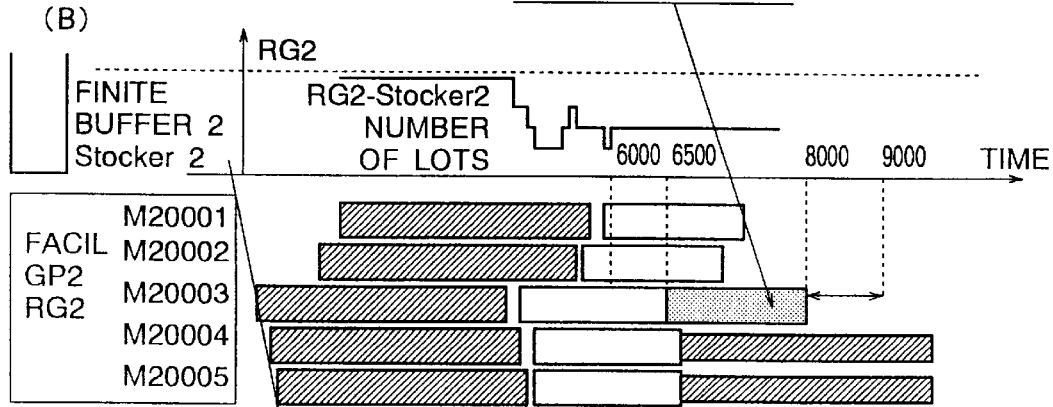
FIG. 5 is a diagram for explaining the first preferred embodiment and showing an example of a buffer schedule time table which is used upon making a finite buffer utilization schedule.

FIG. 5 shows an example of a buffer schedule time table T1213 which is used upon making a finite buffer utilization schedule. The time table T1213 is stored in the storage section 15 per buffer.

Referring to FIG. 5, the time table T1213 is referred to from data about the finite buffer 2 (Stocker 2) of the facility group name RG2. The time table T1213 is a collection of records composed of a time and a stay amount.

In the time table T1213,

"stay amount" represents a stay amount of the lots in the buffer; and

"time" represents a time at which the stay amount of the lots in the buffer changes.

Referring to FIG. 5, in the time table T1213 of, for example, the finite buffer Stocker 2, a stay amount change time by the lot LOT1234 is 6000 and the stay amount is changed to 2 by the lot LOT1234. Although the time is identified by the elapsed numbers from the control start time point, there is no particular limitation to the notation.

An operation of the production controller 1 after the initial setting will now be explained. In the production line to be controlled by the production controller 1, when a lot arrives at a facility group to be controlled, the external utilities 2 being a buffer accomodating the arrived lot or a buffer control device that produces work start signal S2 for the arrived lot.

Further, at a time when it is expected that the work at the facility in the facility group to be controlled is completed and that the work at the facility can be started again, the external utilities 2 being the facility to be controlled, the facility control device and the facility group control device produce a facility work start request signal S3.

Thereafter, at a time when the work at the facility in the facility group to be controlled is completed, the external utilities 2 being the facility to be controlled, the facility control device and the facility group control device compare the estimated schedule and the actual work schedule and, if necessary, produce a schedule correction request control signal S4 for correction.

In the production line to be controlled by the production controller 1, when the production controller 1 receives the arrived lot work start request signal S2 from the external utilities 2 via the input/output section 11, the production controller 1 obtains data about the buffer accommodating the arrived lot, the arrived lot, the facility group at which the lot arrived, and the arrival process from the external utilities 2 being the buffer control device via the input/output section 11 and produces a owrk start request control signal S10 for the arrived lot so as to execute the lot flow control by the progress control means 121.

Further, in response to the facility work start request signal S3 received from the external utilities 2 via the input/output section 11, the production controller 1 obtains, via the input/output section 11, data about the facility for which the work start is requested by the external utilities 2 being the facility control device. If the facility group of the facility satisfies the foregoing condition (I) or (II), the production controller 1 selects a lot to be processed next from the buffer of that facility group based on a predetermined dispatching rule in that facility, and produces the work start request control signal S10. Until a work start for a lot is permitted in the facility, or the work start for all the lots in the buffer of the facility group is attimpted, the attempt for the work start is continued.

Further, in response to the schedule correction request signal S4 received from the external utilities 2 via the input/output section 11, the production controller 1 obtains data about the facility for which the work correction is requested from the external utilities 2 being the facility control device, and an actual work schedule carried out in the facility. Then, after obtaining the lot schedule time table T1211 for the lot from the storage section 15, the production controller 1 produces a schedule correction control signal S21.

In response to the schedule correction control signal S21, the state setting section 14, through the schedule correcting means 142, obtains an estimated schedule of the work lot in the facility and compares it with the work schedule actually carried out.

If a discrepency exists in the current process relative to the actual work schedule so that estimated work schedules of the lot for subsequent processes are changed, the schedule correcting means 142 first invalidates schedules of the lot in the facility schedule time table T1212 and the buffer schedule time table T1213 using the lot schedule time table T1211 of the lot. Then, after invalidating schedules of the lot for the subsequent processes in the lot schedule time table T1211 of the lot, the schedule correcting means 142 makes, in the next process, work schedules for indefinitely staying the lot after a time of arrival at the next process.

The schedule correcting means 142 stores the work schedules in the storage section 15 through the lot schedule managing means 1211, the facility schedule managing means 1212 and the buffer schedule managing means 1213.

Figure 6:
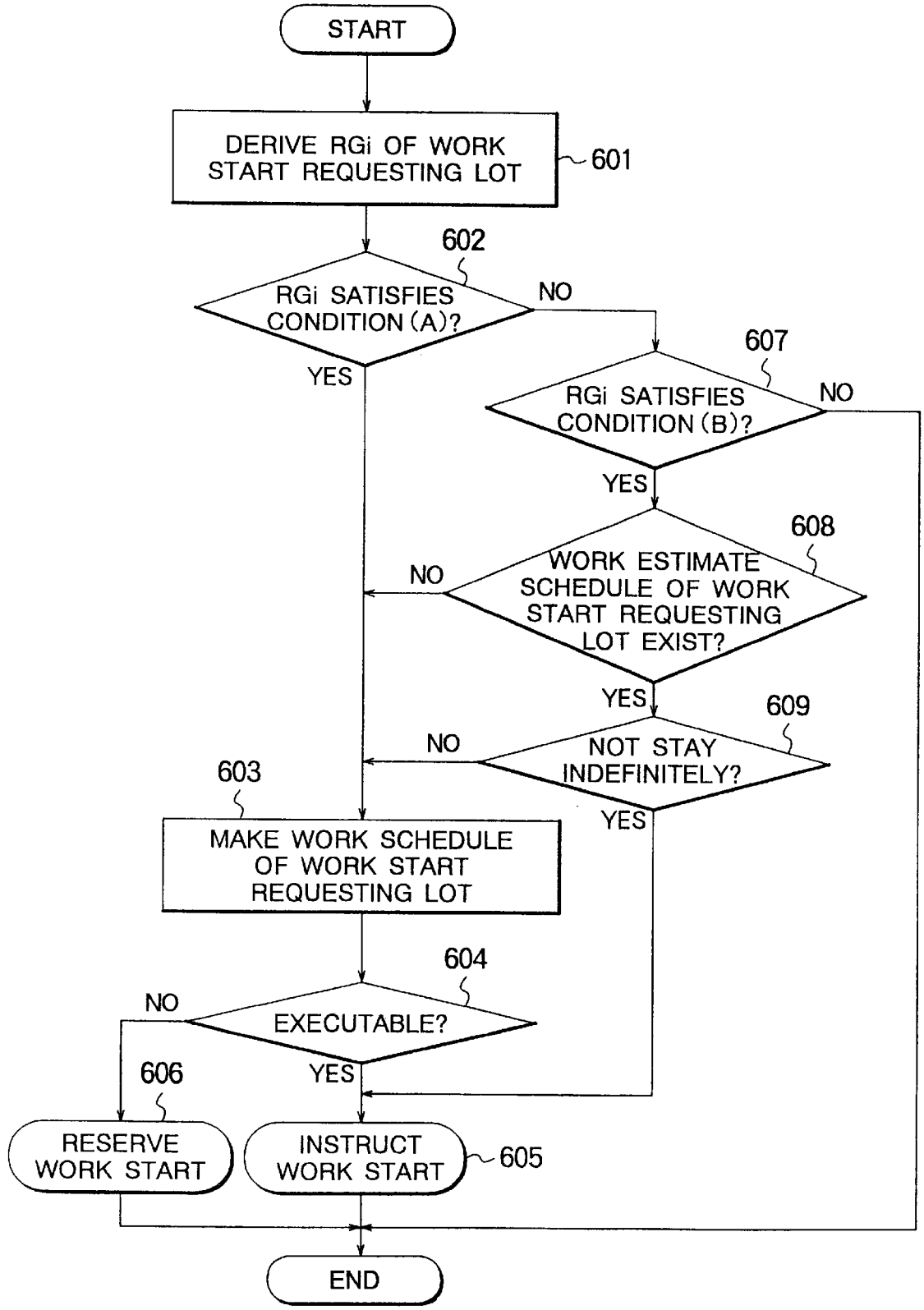
FIG. 6 is a diagram showing a flowchart for explaining an operation of a progress control means according to the first preferred embodiment.

FIG. 6 is a flowchart for explaining an operation of the progress control means 121 according to the first preferred embodiment. With reference to FIGS. 1 and 6, the operation of the progress control means 121 will be explained. In the following description, F121-2, F121-21 and the like represent process steps of the progress control means 121, and F121-21 and F121-22 represent condition branch processes in F121-2.

(Ff121-1) In response to the work start request control signal S10, the progress control means 121 derives a process facility group RGi of a lot requesting the work start (step 601) and determines whether the process facility group RGi satisfies the foregoing condition (I) (step 602). If the condition (I) is satisfied, the progress control means 121 produces the scheduling request control signal S11 relative to the lot and causes the continuous process scheduling means 131 of the scheduling section 13 to make a work estimate schedule of the lot (step 603).

In response to the scheduling request control signal S11, the scheduling section 13, through the continuous process scheduling means 131, obtains from the storage section 15 data about the lot for which the scheduling is requested, the process of the lot and subsequent continuous processes and makes the work schedule by referring to facility groups RGi while the finite buffer facility groups first continue from the process facility group RG1 of the lot.

(F121-2) On the other hand, if the process facility group RGi of the work requesting lot satisfies the condition (II) (Yes at step S607), the progress control means 121, through the lot schedule managing means 1211, obtains the lot schedule time table T1211 of the lot managing work schedules in the storage section 15 and determines presence/absence of setting of a work estimate schedule (step 608).

(F121-3) On the other hand, if the process facility group RGi of the work requesting lot does not satisfy the condition (II) (No at step 607), the progress control means 121 causes the input/output section 11 to notify the external utilities 2 that the lot is not an object to be controlled.

(F121-21) If the time table of the lot is not set (No at step 608), the progress control means 121 produces the scheduling request control signal S11 for the lot to cause the continuous process scheduling means 131 of the scheduling section 13 to make a work estimate schedule in the schedule time table T1211 of the lot (step 603).

(F121-211) If an executable schedule is obtained (Yes at step 604), the progress control means 121 produces the work start command control signal S5 via the input/output section 11 (S12→S13→S5) to notify a work start time of the lot to the external utilities 2 being the buffer control device, the facility group control device and so forth (step 605).

(F121-212) If the executable schedule is not obtained (no at step 604), the progress control means 121 produces the work non-start control signal S6 via the input/output section 11 to notify the external utilities 2 being the buffer control device, the facility group control device and so forth that the work start for the lot is not carried out (work start reserve) (step 606).

(Ff121-22) If the time table of the lot is set, the lot schedule managing means 1211 obtains a stay period in the current process facility group RGi to determine whether to indefinitely stay the lot by referring to the lot schedule time table T1211 as shown in FIG. 3 (step 609).

(F121-221) If the lot does not stay indefinitely in the facility group RGi (Yes at step 609), the progress control means 121 obtains the work schedule from the storage section 15 and produces, through the input/output section 11, the work start control signal S5 so as to notify a work start time of the lot to the external utilities 2 being the buffer control device, the facility group control device and so forth (step 605).

(F121-222) If the lot stays indefinitely in the facility group RGi (No at step 609), the progress control means 121, through the buffer schedule managing means 1213, releases the indefinite-term stay of the lot in the current process facility group RGi and then produces the scheduling request control signal S11 for the lot to cause the continuous process scheduling means 131 to make a work schedule of the lot subsequent to the current process facility group RGi (step 603).

If the scheduling after the facility group RGi can not be achieved, the progress control means 121, through the buffer schedule managing means 1213, sets the work lot to again indefinitely stay in the facility group RGi and then, through the input/output section 11, produces the work start reserve control signal S6 (S13→S6) to notify the external utilities 2 being the buffer control device, the facility group control device and so forth that the work start for the lot is not carried out.

In response to the work start command control signal S5 received from the production controller 1, the external utilities 2 being the facilities, the facility control device, the facility group control device, the buffers, the buffer control device and so forth control operations of the facilities and the devices based on data about the work lot, the work facility, the work start time, the work finish time and so forth sent from the production controller 1. On other hand, in response to the work start reserve control signal S6 sent from the production controller 1, the external utilities 2 reserve the work start until next time.

Figure 7:
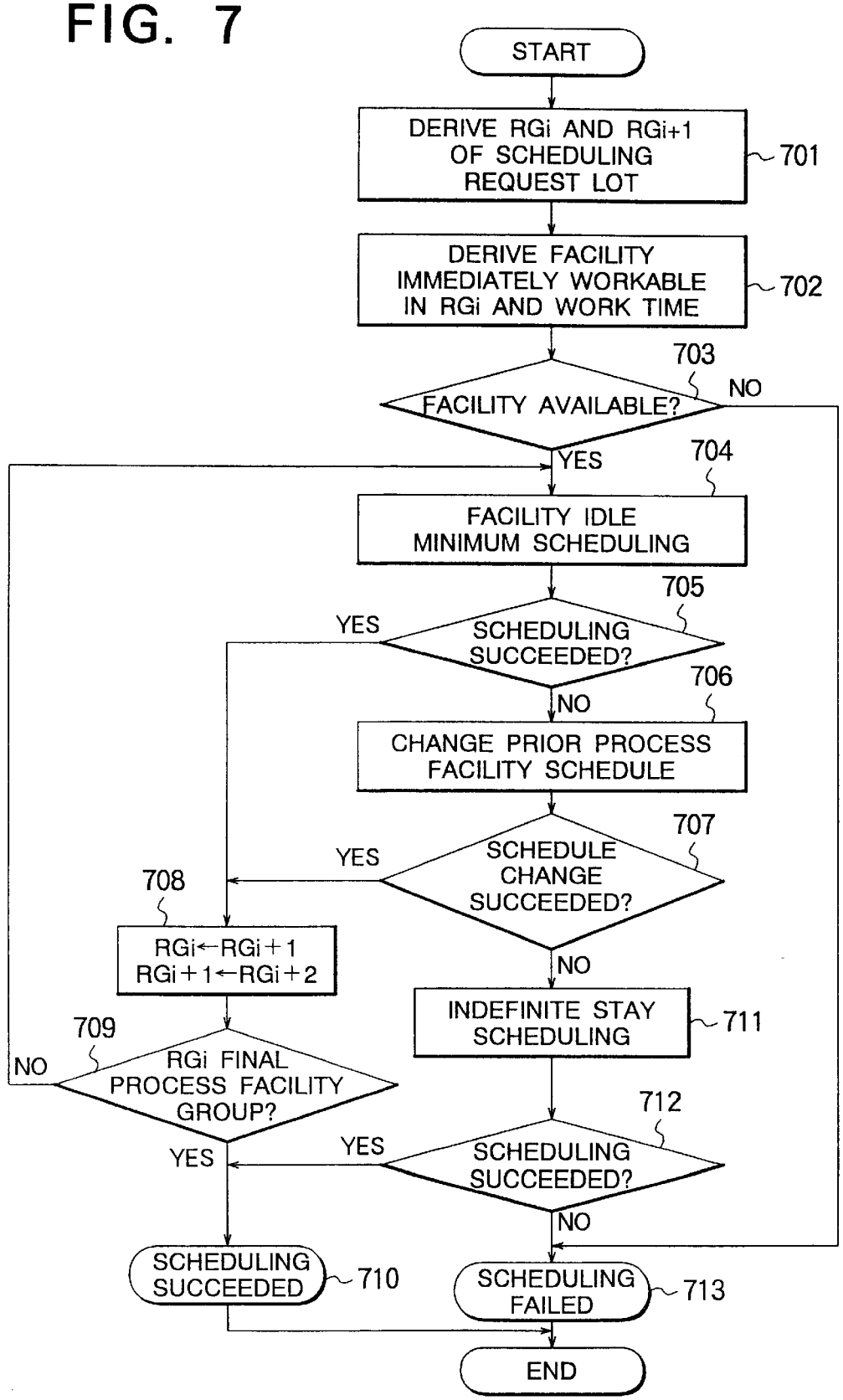
FIG. 7 is a diagram showing a flowchart for explaining an operation of a continuous process scheduling means according to the first preferred embodiment.

FIG. 7 is a flowchart for explaining an operation of the continuous process scheduling means 131 according to the first preferred embodiment. With reference to FIGS. 1 and 7, the operation of the continuous process scheduling means 131 will be explained.

(F131-0) In response to the scheduling request control signal S11, the continuous process scheduling means 131 refers to the current process facility group RGi of the lot for which the scheduling is requested, so as to derive a next process facility group RGi+1 relative to the referring facility group RGi (step 701).

Then, the continuous process scheduling means 131 derives a facility which is workable after a time t0 of arrival of the lot at the facility group RGi, and a work time (step 702).

(F131-0-1) If no workable facility is available (No at step 703), the process by the continuous process scheduling means 131 is finished as determining that the scheduling of the work is impossible (step 713).

(F131-0-2) If the workable facility is available (Yes at step 703), the continuous process scheduling means 131 obtains from the storage section 15 the production managing data necessary for calculation of a work time in the work process and a time requeired from the work finish to an arrival at the next process, and calculates a work start estimate time t0, a work finish estimate time t1 and an estimate time t2 of arrival at the next process facility group RGi+1.

(F131-1) The facility idle minimum scheduling means 1311 determines whether it is possible to make a buffer stay schedule after the time t2 of arrival of the lot at the next process facility group RG1+1 (steps 704 and 705). The determination is carried out by checking based on the number of waiting lots Ni (t2) of the facility group RGi calculated by a below-noted formula (2) whether the number of waiting lots Ni+1 (t2) of the next process facility group RGi+1 always satisfies $$Si+1 \geq Ni+1\ (t2) \qquad (3)$$

while staying in the next process facility group RGi+1.

$$Ni(t2) = \sum_{V\,j[a_{i,j} \leq t2 < s_{i,j}]} 1 \qquad (2)$$

In the foregoing formulae, Si+1 represents a buffer capacity of the next process facility group RGi+1 relative to the process facility group RGi of the lot, t2 represents an estimate time of arrival of the work start determining lot at the next process facility group RGi+1, ai,j represents a time of arrival of a lot j at the facility group RGi, and si,j represents a process start time of the lot j in the facility group RGi.

If the scheduling is possible (Yes at step 705), a work schedule is derived and, by setting the next process facility group RGi+1 as a reference facility group RGi and a next process facility group RGi+2 as a reference facility group RGi+1, the process is executed again from (F131-1). In this case, if the reference process RGi becomes the final process or if the next process facility group RGi+1 becomes an infinite buffer facility group, the continuous scheduling is normally finished.

(F131-2) If the work scheduling about the lot in the referring facility group RGi is impossible by the facility idle minimum scheduling means 1311, the prior process facility schedule changing means 1312 derives a buffer of the next process facility group RGi+1 relative to the referring facility group RGi and determines whether the work start time of the facility group RGi can be shifted such that the lot arrives at the facility group RGi+1 at the earliest time when the work in the next process facility group RGi+1 becomes possible. If positive, the schedule is shofted. Then, after setting the next process facility group RGi+1 as a reference facility group RGi and the next process facility group RGi+2 as a reference facility group RGi+1, the process is executed again from (F131-1), that is, from step 704 in FIG. 7. At this time, if the reference facility group RGi becomes the final process facility group or if the next process facility group RGi+1 becomes the infinite buffer facility group (Yes at step 709), the continuous scheduling is normally finished (step 710).

(F131-3) If the change of the work schedule of the lot in the referring facility group RGi is impossible by the prior process facility schedule changing means 1312 (No at step 707), the indefinite-term stay scheduling means 1313 determines whether the lot can stay indefinitely from an arrival time in the referring facility group RGi (steps 711 and 712). If positive (Yes at step 712), the stay period of the lot in the reference facility group RGi is set to be indefinite from the foregoing lot arrival time, and the continuous scheduling process is normally finished.

(F133-4) If the indefinite-term stay of the lot in the referring facility group RGi is impossible by the indefinite-term stay scheduling means 1313 (No at step 712), the continuous process scheduling means 131 terminates the continuous scheduling process as having failed.

(F131-5) If the continuous process scheduling means 131 has normally finished the continuous scheduling through the processes (F131-1 to F131-4), the continuous process scheduling means 131 stores the work schedules prepared from the work request lot process facility group up to the reference facility group RGi in the storage section 15, as the work estimate schedules in the respective processes of the lot by the lot schedule managing means 1211, as the facility work estimate schedules in the respective process facility groups by the facility schedule managing means 1212, and as the buffer stay estimate schedules in the respective process facility group finite buffers by the buffer schedule managing means 1213. Then, the continuous process scheduling means 131, through the input/output section 11, produces the work start command control signal S5 (S12→S13→S5) to notify the work start instructions representing the work start time of the lot in the arrived facility to the external utilities 2 being the buffer control device, the facility group control device and so forth.

(F131-6) If the continuous process scheduling means 131 fails in continuous scheduling through the processes (F131-1 to F131-4), the continuous process scheduling means 131, through the input/output section 11, produces the work start reserve signal S6 to notify the reserve of the work start to the external utilities 2.

Figure 8:
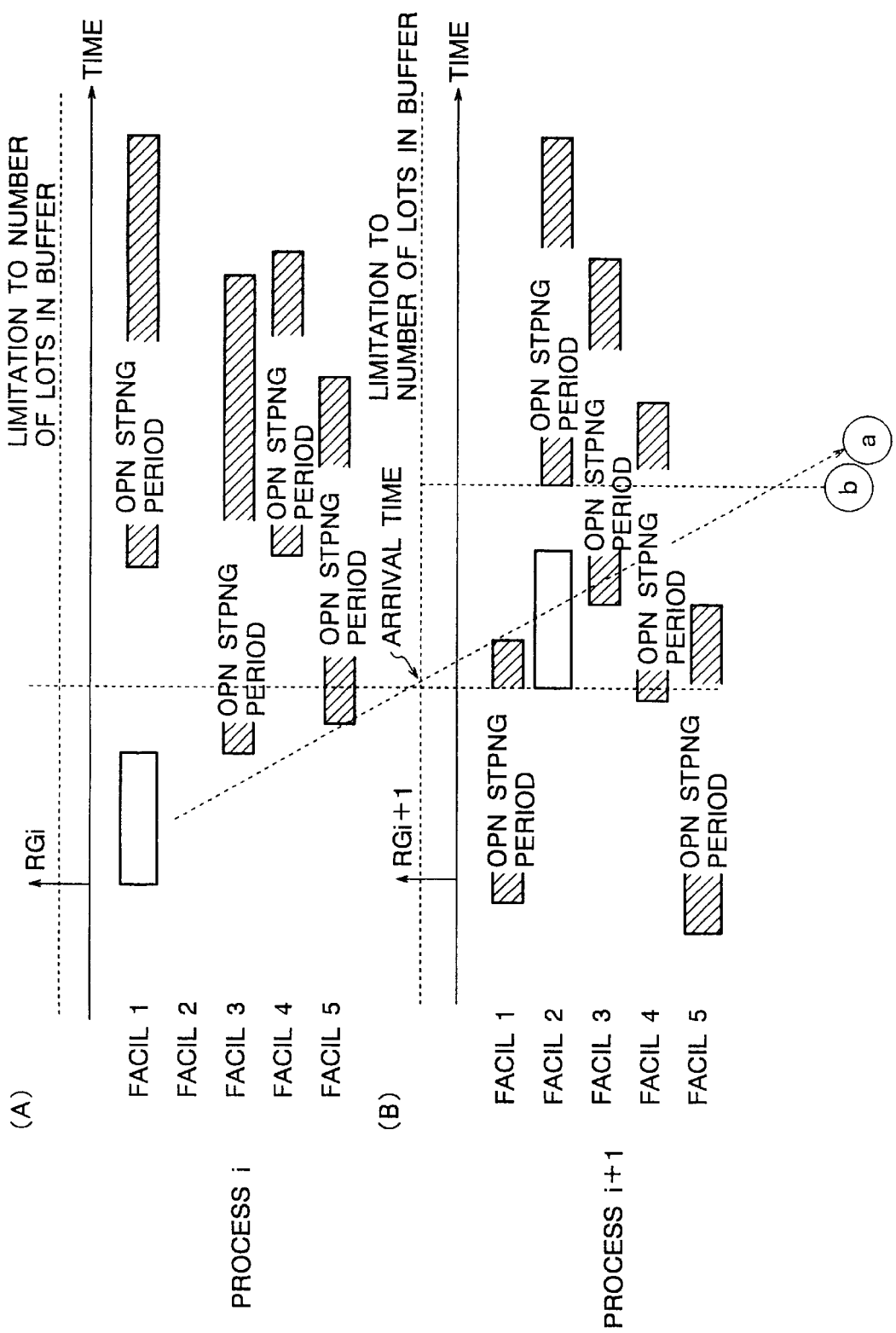
FIGS. 8 and 9 are diagrams for explaining an example of work scheduling performed by a continuous process scheduling means according to the first preferred embodiment, and schematically showing that, upon preparation of work lot schedules by the continuous process scheduling means, all the work schedules for continuous finite buffer facility groups from RGi to RGi+n have been made by a facility idle minimum scheduling means or a prior process facility scheduling means.
Figure 9:
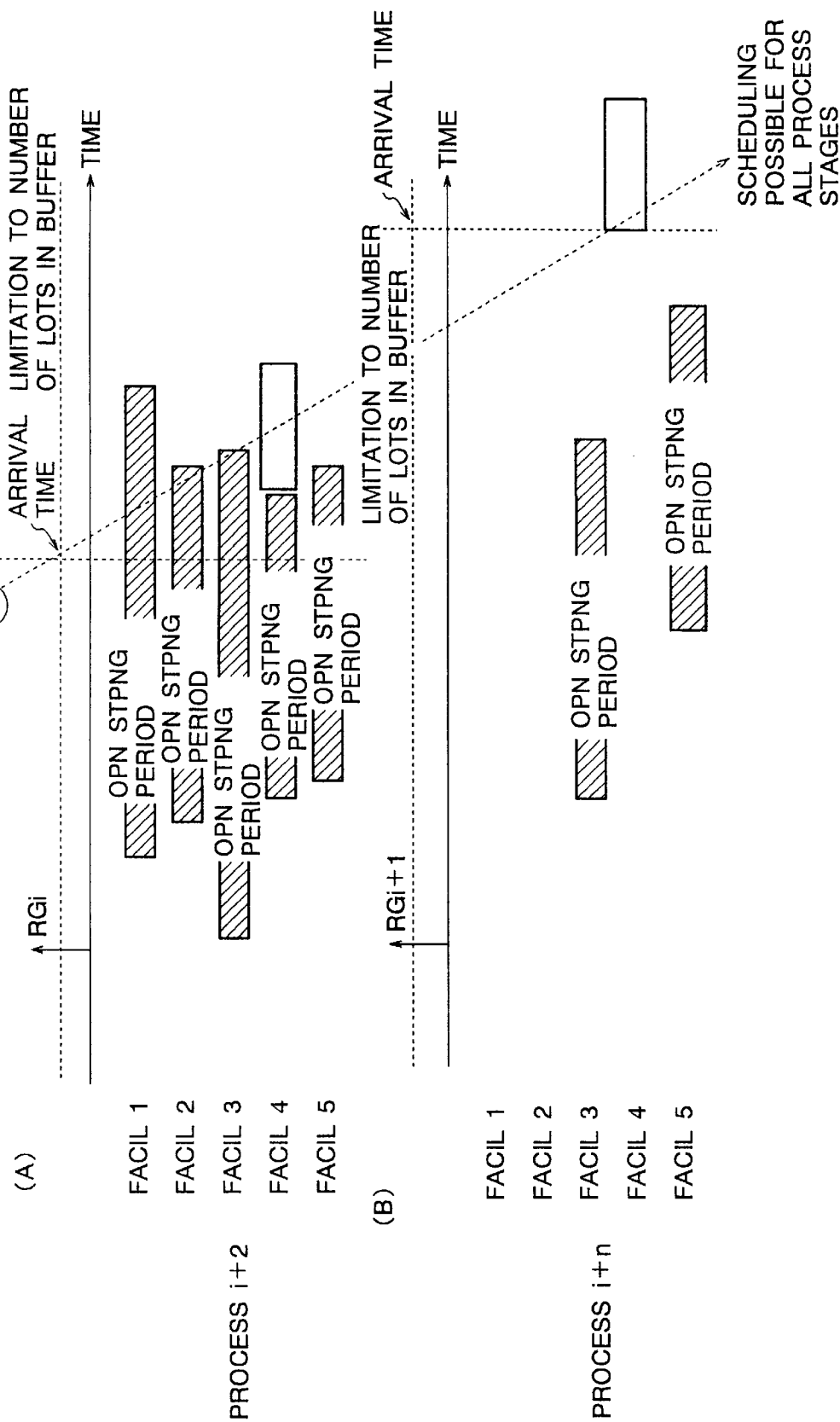

FIGS. 8 to 13 show examples of the work scheduling carried out by the continuous process scheduling means 131 in the finite buffer facility groups which are continuous in the working procedure, according to the first preferred embodiment. FIGS. 8 and 9 are divided for convenience of drawing preparation, and so are FIGS. 10 and 11 and FIGS. 12 and 13, respectively. In FIGS. 8 to 13, graphs of time-domain change in number of waiting lots in the buffers of the respective facility groups and schedule charts in which a work estimate time segment is identified by a white rectangle and a facility stopping period is identified by a gray (hatched) rectangle per facility of the facility groups are arranged vertically, and further, the finite buffer facility groups which are continuous in the working procedure are listed in order of appearance according to the working procedure. The shown states of the buffers and the facilities are stored and managed in the storage section 15 by the lot schedule managing means 1211, the facility schedule managing means 1212 and the buffer schedule managing means 1213.

The work scheduling carried out by the continuous process scheduling means 131 according to the first preferred embodiment will be explained using FIGS. 8 to 13. FIGS. 8 to 13 shows results of the work prediction of the lot as an object to be determined on the work start and the buffer stay prediction carried out in all the finite buffer facility groups which are continuous in the working procedure subsequent to the process facility group of the lot, when the lot arrives at the buffer or the work start request is raised for the certain lot in the facility group which satisfies the foregoing condition (I) or (II).

FIGS. 8 and 9 schematically show that, upon preparation of the work lot schedules by the continuous process scheduling means 131, all the work schedules for the continuous finite buffer facility groups from RGi to RGi+n have been made by the facility idle minimum scheduling means 1311 or the prior process facility scheduling means 1312.

Figure 10:
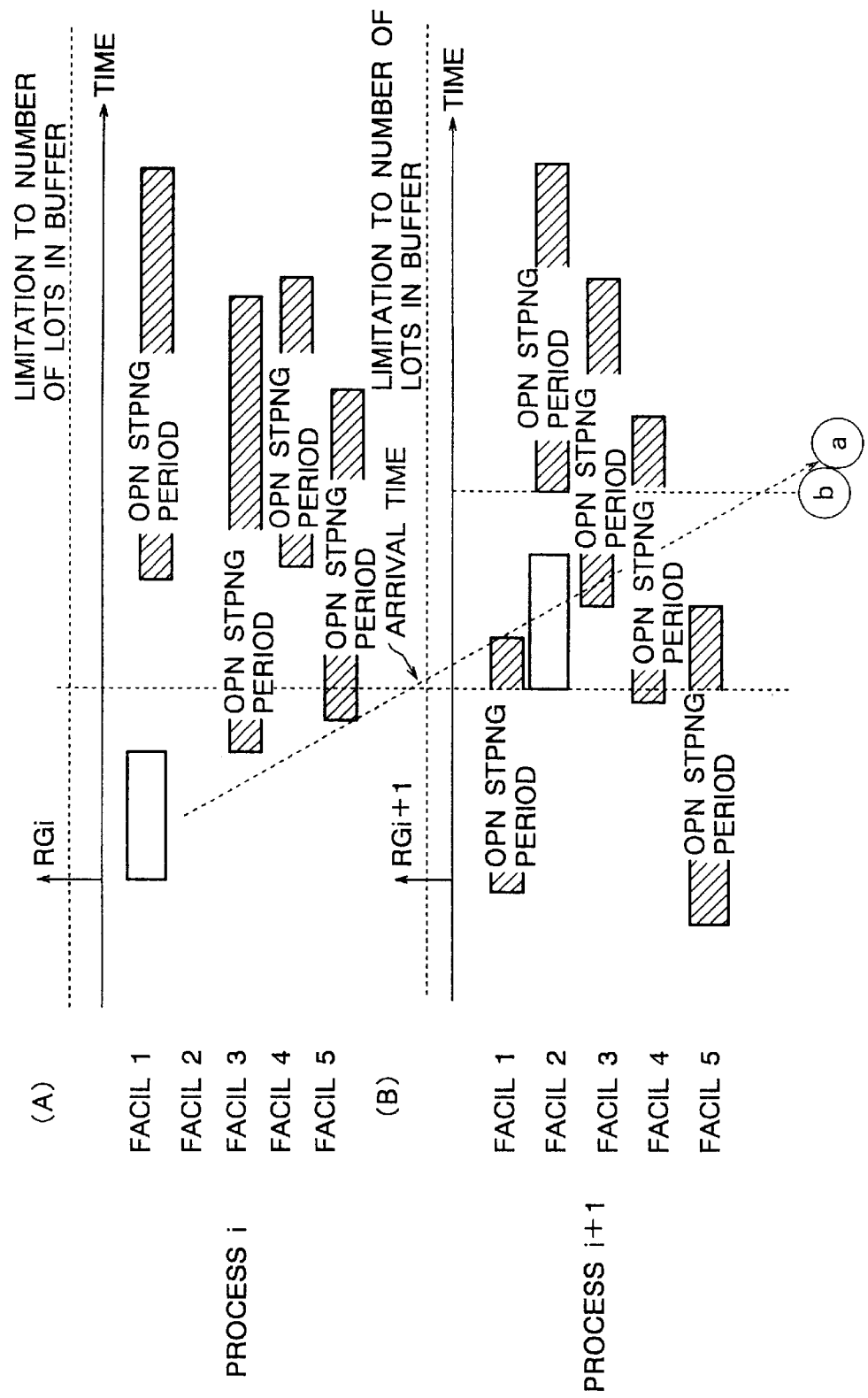
FIGS. 10 and 11 are diagrams for explaining an example of work scheduling performed by the continuous process scheduling means according to the first preferred embodiment, and schematically showing that, upon preparation of the work lot schedules by the continuous process scheduling means, the work schedules are not obtained by the facility idle minimum scheduling means due to excess of the buffer capacity at a facility group RGi+3 and, instead, a schedule for indefinitely staying the lot in the intermediate process facility group RGi+2 has been made by a prior process facility scheduling means.
Figure 11:
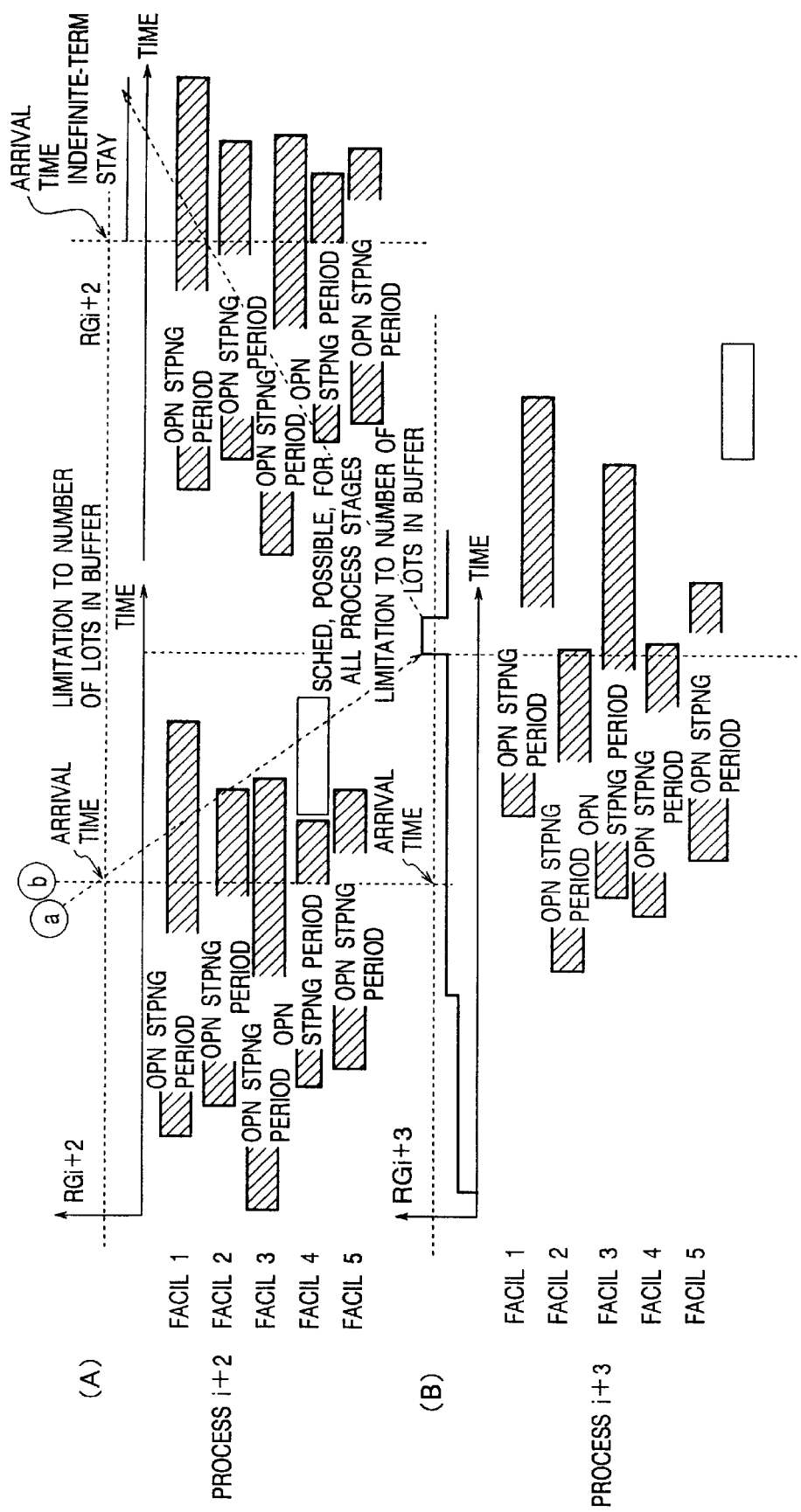

FIGS. 10 and 11 schematically show that, upon preparation of the work lot schedules by the continuous process scheduling means 131, the work schedules are not obtained by the facility idle minimum scheduling means 1311 due to excess of the buffer capacity at the facility group RGi+3 and, instead, the schedule for indefinitely staying the lot in the intermediate process facility group RGi+2 has been made by the prior process facility scheduling means 1312.

As shown in FIGS. 8 to 11, when the work schedules have been made, the continuous process scheduling means 131, based on the prepared work schedules, preengages the work estimate schedules of the work lot by the lot schedule managing means 1211, preengages the facilities to be used in the continuous finite buffer facility groups and their schedules by the facility schedule managing means 1212, and further preengages the buffer schedules by the buffer schedule managing means 1213, and then carries out the work start in the current process facility group of the lot.

Figure 12:
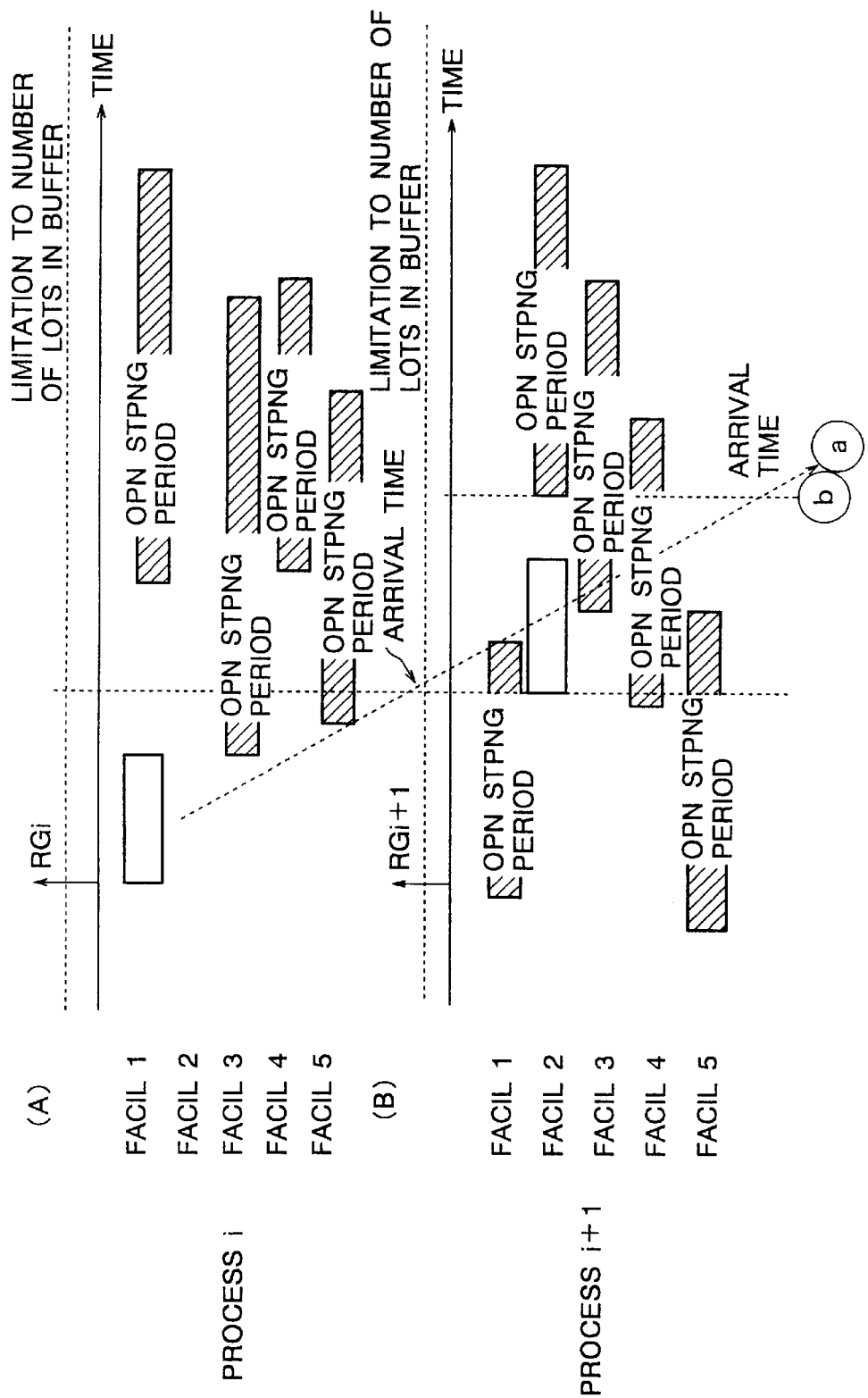
FIGS. 12 and 13 are diagrams for explaining an example of work scheduling performed by the continuous process scheduling means according to the first preferred embodiment, and schematically showing that, upon preparation of the work lot schedules by the continuous process scheduling means, the work schedules have not been obtained due to excess of the buffer capacity at a facility group RGi+2.
Figure 13:
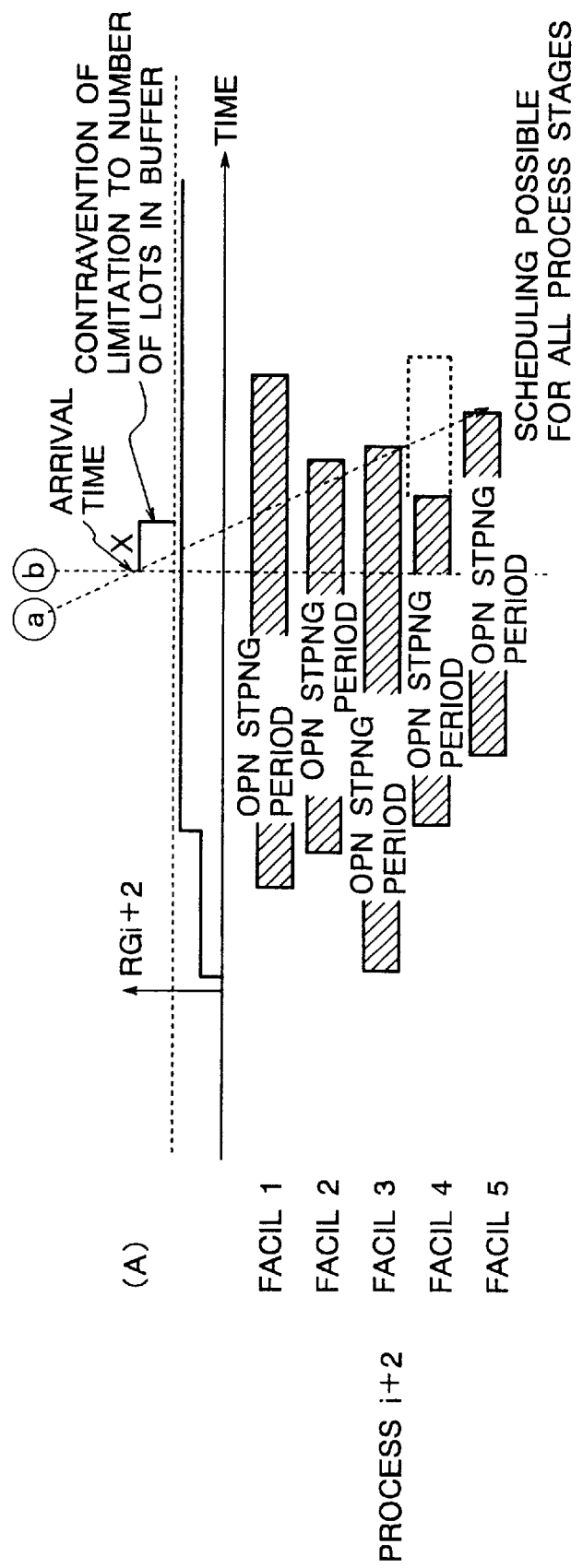

FIGS. 12 and 13 schematically show that, upon preparation of the work lot schedules by the continuous process scheduling means 131, the work schedules have not been obtained (scheduling impossible state for all the process stages) due to excess of the buffer capacity at the facility group RGi+2.

In this case, since the buffer stay at the prior process facility group can not be achieved, the work start for the lot in the current process facility group RGi is not carried out, and the next work start request is waited.

As described above, when performing the scheduling of the work-object lot in the facility groups to be controlled by the production controller 1, the continuous process scheduling means 131 carries out the work start for the lot when the conditions of (E-1) the work schedules executable for all the finite buffer facility groups which are continuous in the working procedure can be prepared; and in addition, (E-2) the work schedule executable up to a midway of the continuous finite buffer facility groups and the schedule capable of the indefinite-term stay in the intermediate process can be prepared (the work schedule for the continuous finite buffer facility groups subsequent to the indefinite-term stay process is prepared after the lot actually arrives at the indefinite-term stay facility group and waits for the state where the scheduling is possible);

are satisfied.

Now, the second preferred embodiment of the present invention will be described. First, an example of an operation of the facility idle minimum scheduling means 1311 will be explained according to the second preferred embodiment.

Figure 14:
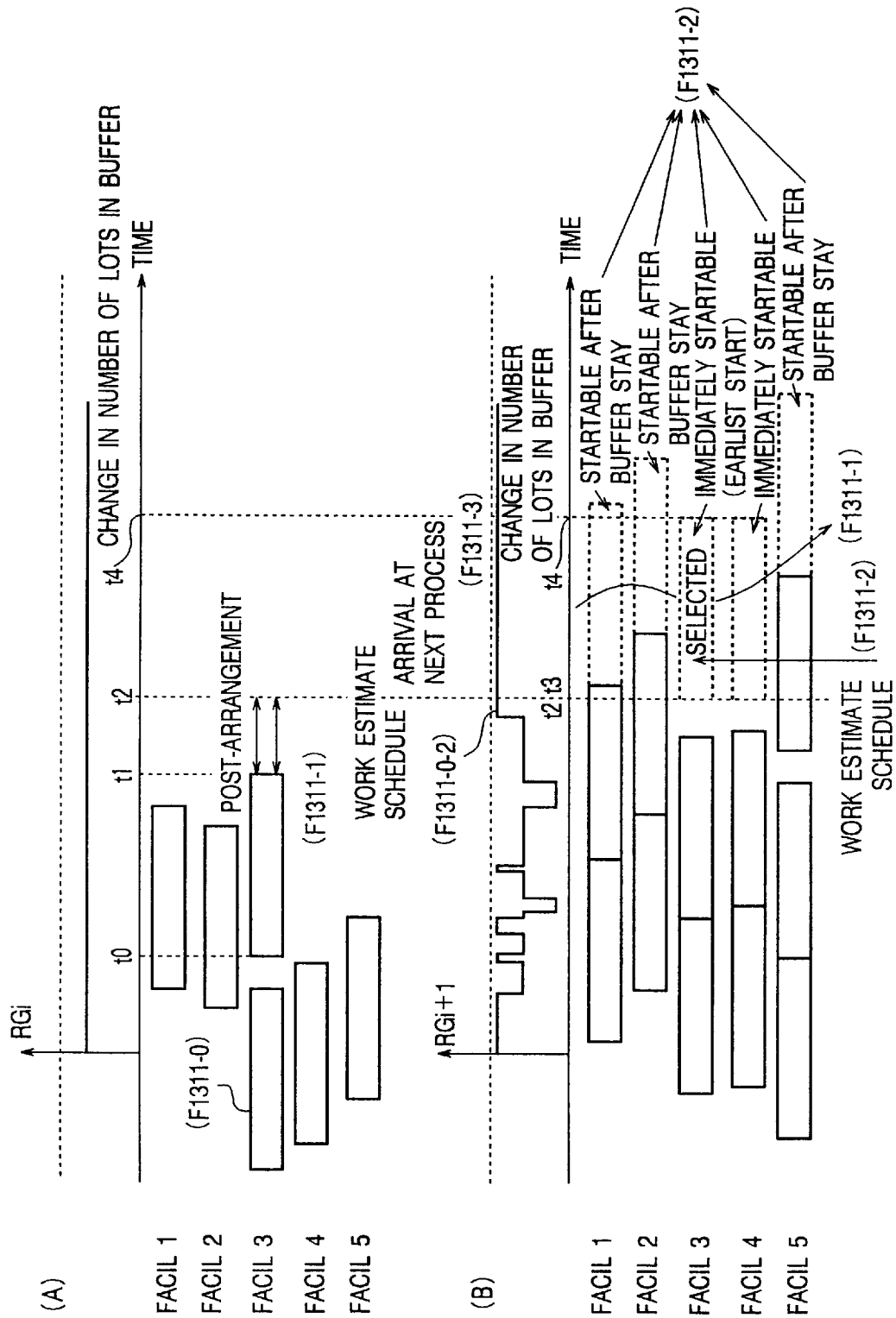
FIG. 14 is a diagram for explaining an example of work scheduling performed by a facility idle minimum scheduling means according to a second preferred embodiment of the present invention, and schematically showing that, after deriving an immediately startable facility 3 in a facility group RGi by a continuous process scheduling means and calculating a work finish time in the facility group RGi and an arrival time t2 at a next process facility group RGi+1, a search is carried out for a usable facility in the next process facility group RGi+1 and a work idle time zone in the usable facility so that facilities 1 to 5 are found to be usable facilities and the facility 3 has been selected from among the plurality of usable facilities as a result of selection of the usable facility.
Figure 15:
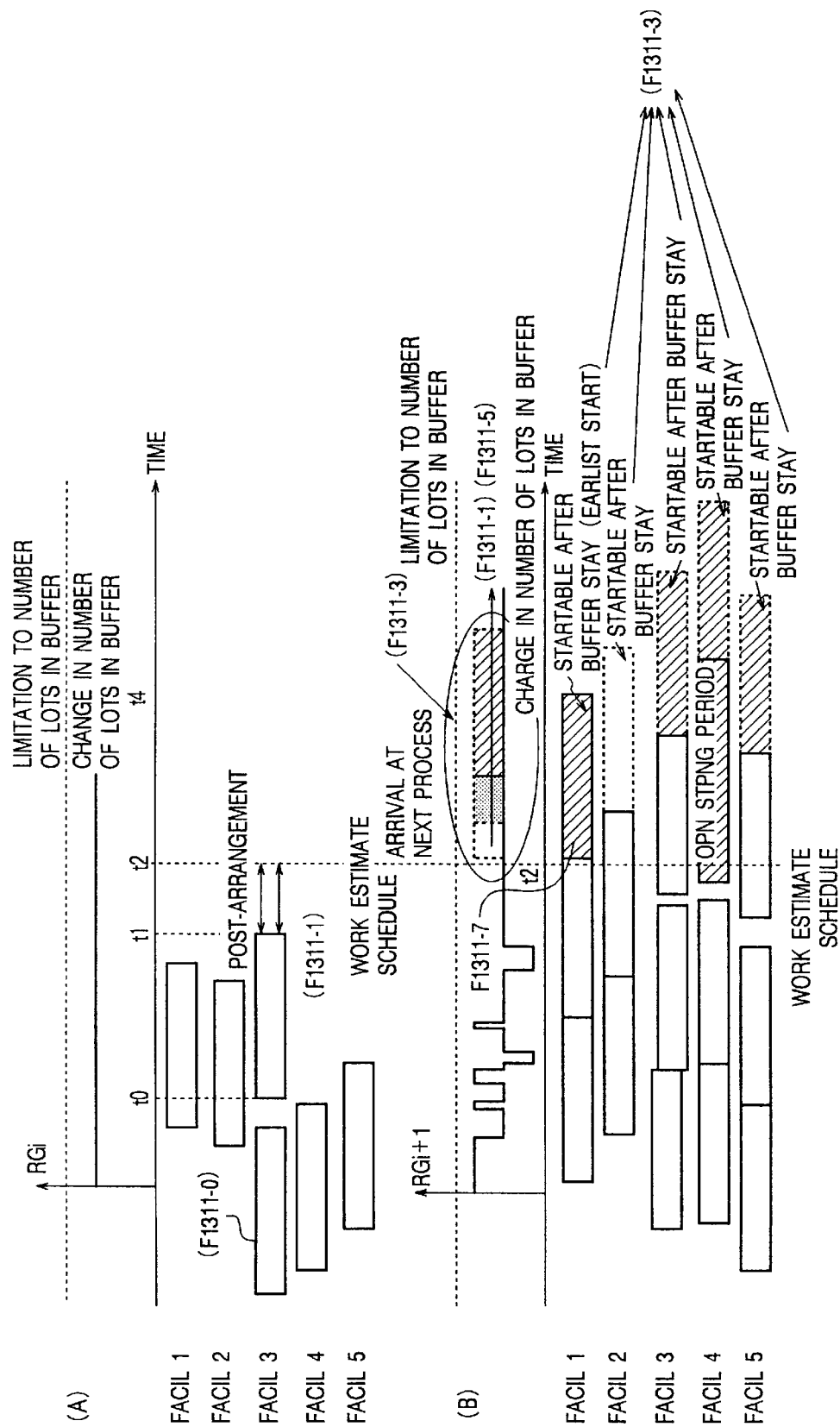
FIG. 15 is a diagram for explaining an example of work scheduling performed by the facility idle minimum scheduling means according to the second preferred embodiment, and showing all the facilities usable after the arrival time at the next process facility group RGi+1 and work times, and a selected facility 1 and a workable time segment, showing that a buffer of the next process facility group RGi+1 does not exceed the maximum capacity, that the work of the facility 1 of the next process facility group RGi+1 is preengaged, and further showing that a buffer of a next process facility group RGi i+1 does not exceed the maximum capacity.
Figure 16:
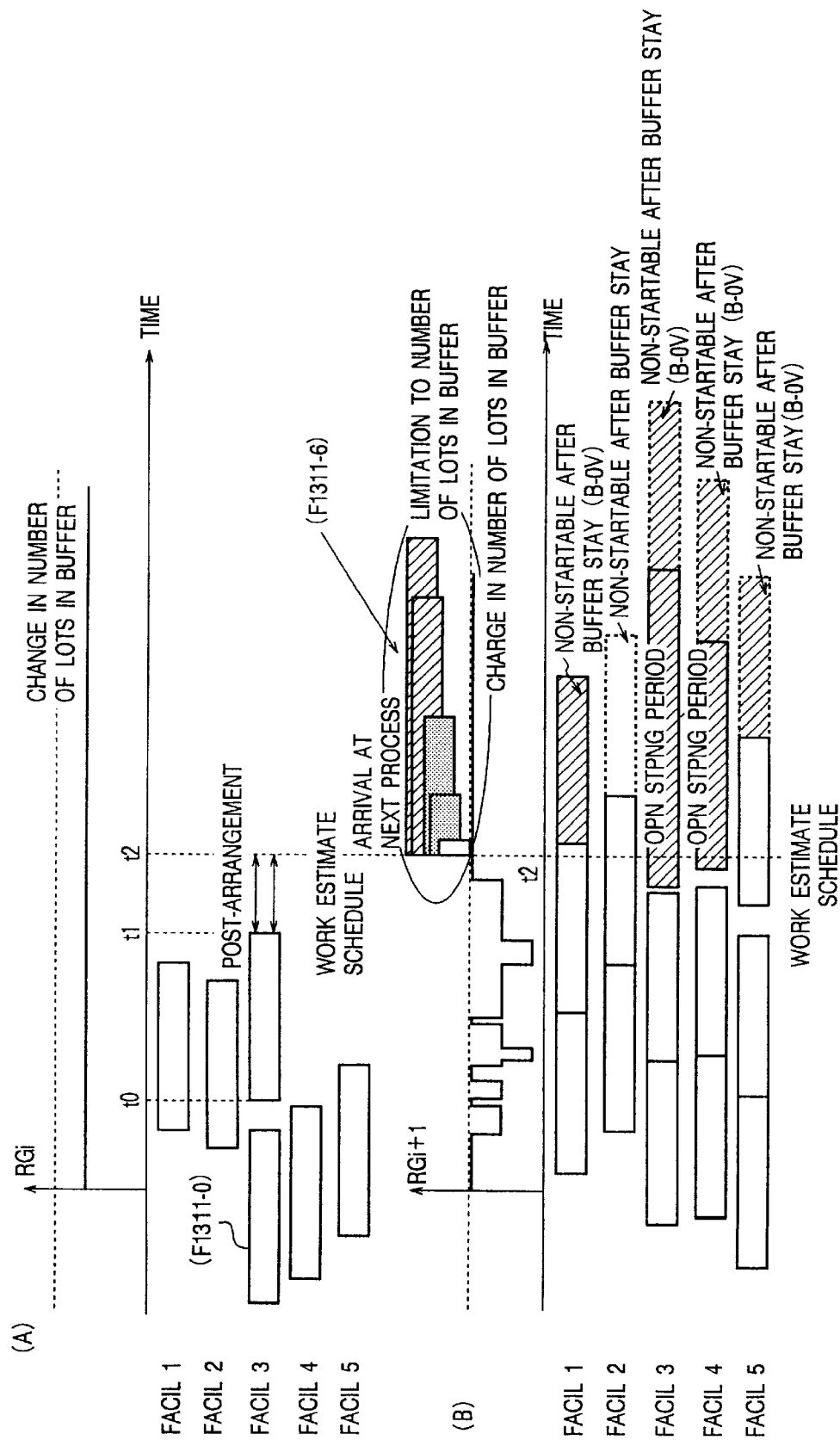
FIG. 16 is a diagram for explaining an example of work scheduling performed by the facility idle minimum scheduling means according to the second preferred embodiment, and schematically showing that, since the buffer capacity of the next process facility group RGi+1 is exceeded at the arrival time t2 at the next process facility group RGi+1, the work in the facility group RGi is not carried out.
Figure 17:
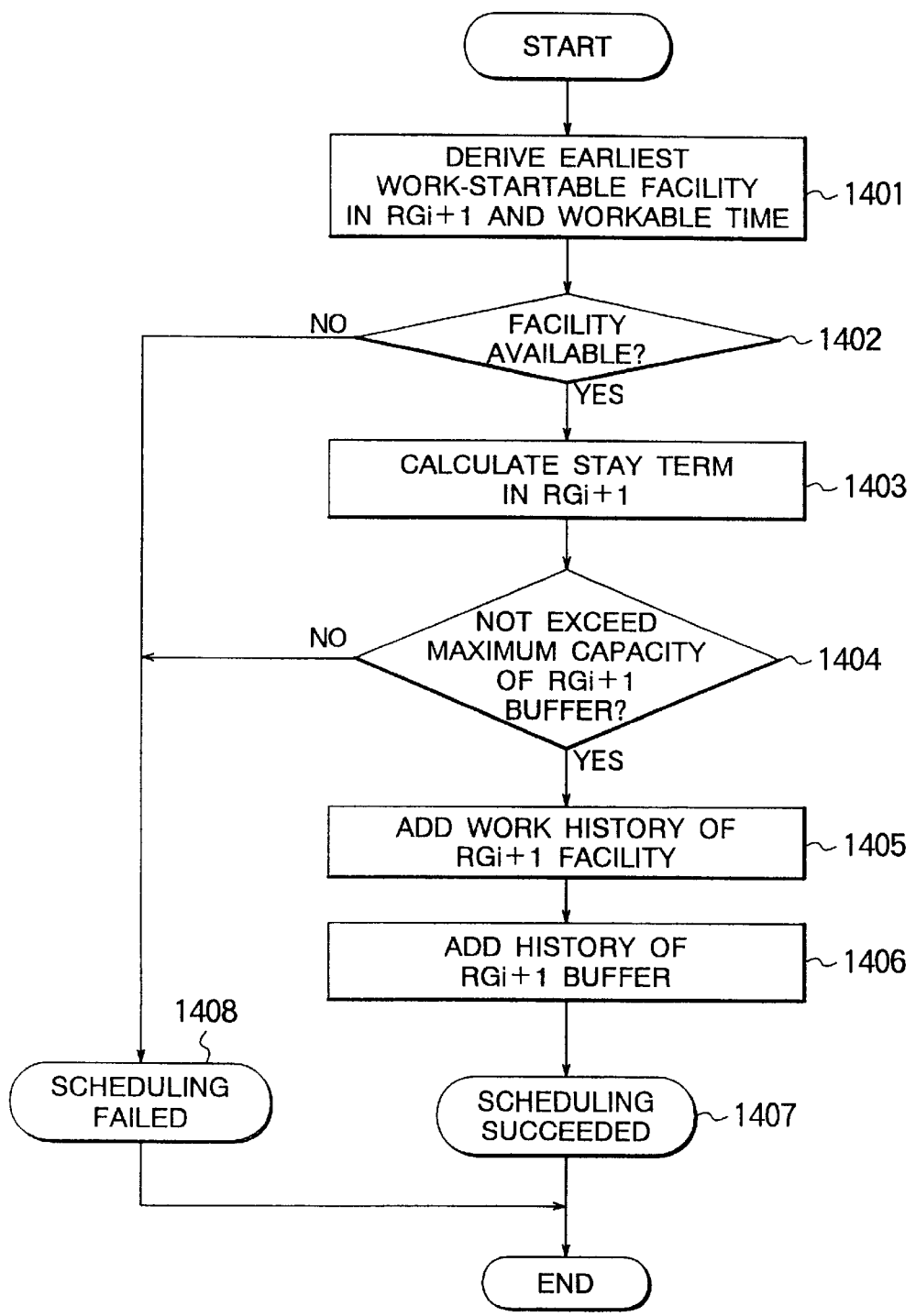
FIG. 17 is a diagram showing a flowchart for explaining an operation of a facility scheduling means according to the second preferred embodiment.

FIGS. 14 to 16 show examples of work scheduling carried out by the facility idle minimum scheduling means 1311, and FIG. 17 is a flowchart for explaining the operation of the facility scheduling means 1311.

Now, the work scheduling will be briefly explained. The facility idle minimum scheduling means 1311 carries out the following processes (F1311-1 to F1311-12) with respect to facility groups i and work lots.

(F1311-1) The facility idle minimum scheduling means 1311 obtains the production managing data necessary for calculation of a work time in the next process from the storage section 15 and derives the work time in a next process facility group i+1. Then, through the facility schedule managing means 1212, the facility scheduling means 1311 searches a work estimate time zone (t3, t4) (see FIG. 14) and a facility in the next process which can be used up to a work finish time of the next process, by referring to operation histories of the respective work facilities of the next process facility group i+1 (step 1401 in FIG. 17).

(F1311-2) If a plurality of facilities which can be used are available (step 1402), for example, a rule may be applied to select one of the facilities which can start the work earliest.

(F1311-3) If no usable facility is available, the facility idle minimum scheduling means 1311 obtains an estimate time t2 of arrival of the work start requesting lot at the next process facility group so as to derive a next process work start time t3 at which the work start in the next process facility group becomes possible, a next process work finish estimate time t4, a work facility and a work estimate time zone (t3, t4).

(F1311-4) Through the buffer schedule managing means 1213, the facility idle minimum scheduling means 1311 obtains a change history of a buffer of the next process facility group i+1 of the lot for which the work start is requested relative to a work wait time zone (t2, t3) from the arrival time to the work start estimate time.

(F1311-5) It is determined whether the number of lots in the buffer of the next process facility group i+1 exceeds the maximum capacity (step 1404).

(F1311-6) If the number of lots in the buffer exceeds the maximum capacity (No at step 1404), the process of the facility idle minimum scheduling means 1311 is finished as determining that the work scheduling is impossible (step 1408).

(F1311-7) If the number of lots in the buffer does not exceed the maximum capacity (Yes at step 1404), a work history (t3, t4) is added to the operation history with respect to the usable next process work facility obtained in the foregoing manner (step 1405).

(F1311-8) Through the buffer schedule managing means 1213, a capacity history of the work wait time zone (t2, t3) is updated with respect to the buffer of the next process facility group i+1 of the lot requesting the work start. Then, through the facility schedule managing means 1212, the work estimate time zone is added to the operation history of the usable work facility of the next process facility group i+2 (step 1406). Because of determining that the work scheduling is possible, the process of the facility idle minimum scheduling means 1311 is finished (step 1407).

In FIG. 14, (F1311-0) represents that an immediately work startable facility 3 has been derived in the facility group RGi by the continuous process scheduling means 131, and (F1311-0) represents calculation results of the work finish time at the facility group RGi and the time t2 of arrival at the next process facility group RGi+1.

Further, (F1311-1) represents a search process for a usable facility in the next process facility group RGi+1 and a work idle time zone of the usable facility, and (F1311-2) represents that the usable facilities are facilities 1 to 5 and that the facility 3 has been selected from among the plurality of usable facilities as a result of selection of the usable facility.

In FIG. 15, (F1311-3) represents that all the facilities usable after the arrival time at the next process facility group RGi+1 and work times, and the selected facility 1 and a workable time segment, (F1311-4) and (F1311-5) represent that the buffer of the next process facility group RGi+1 does not exceed the maximum capacity, (F1311-7) represents that the work of the facility 1 of the next process facility group RGi+1 is preengaged, and (F1311-8) represents that a buffer of a next process facility group RGi+1 does not exceed the maximum capacity.

In FIG. 16, (F1311-6) represents a case in which, since the buffer capacity of the next process facility group RGi+1 is exceeded at the arrival time t2 at the next process facility group RGi+1, the work in the facility group RGi is not carried out.

Figure 18:
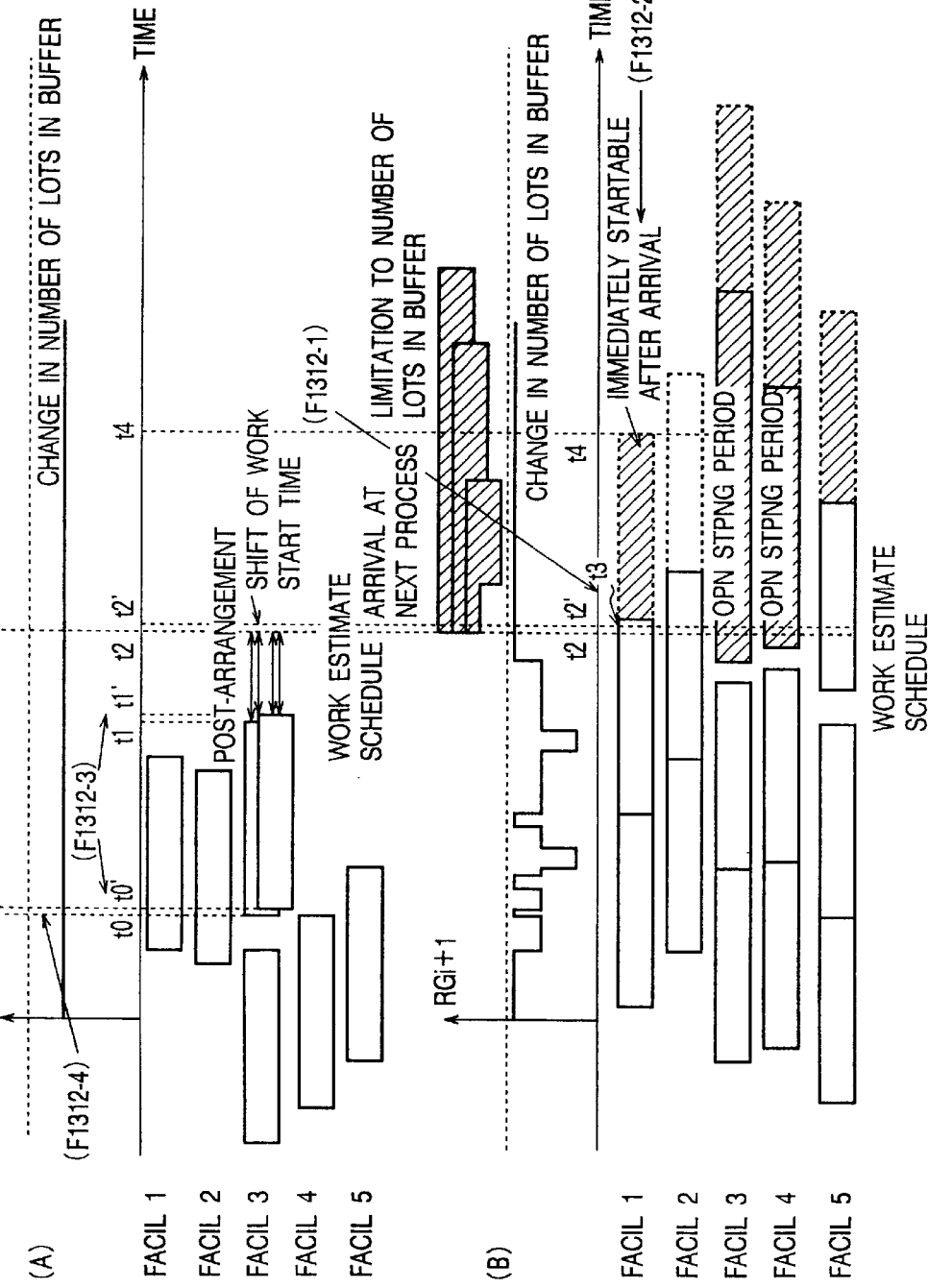
FIG. 18 is a diagram for explaining an example of a changing process for work schedules of a prior process facility group carried out by a prior process facility schedule changing means according to the second preferred embodiment, and schematically showing that, after deriving a facility immediately startable in work at a time t2' at which the work is startable in the facility group RGi+1 without lot stay, a work start time t0' and a finish time t1' in the facility group RGi are derived and, as a result of a check of a lot stay term in the facility group RGi, the number of lots in the buffer is within the buffer maximum capacity so that the lot stay is possible.

Now, an example of an operation of the prior process facility schedule changing means 1312 according to the second preferred embodiment will be explained with reference to FIGS. 18 and 19. FIG. 18 is a diagram schematically showing an example of a changing process for the work schedule of the prior process facility group carried out by the prior process facility schedule changing means 1312, and FIG. 19 is a flowchart for explaining the operation of the prior process facility schedule changing means 1312.

Figure 19:
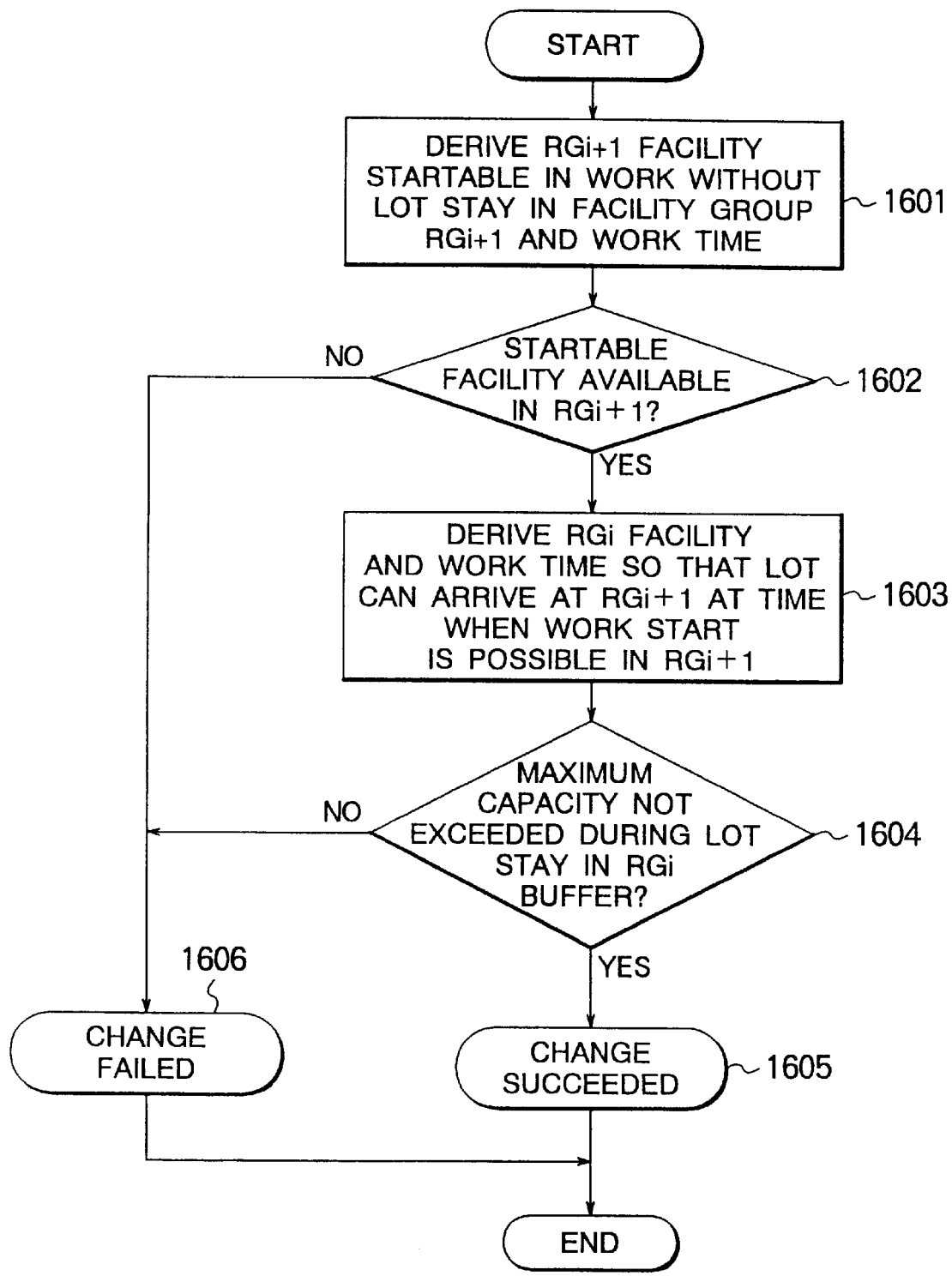
FIG. 19 is a diagram showing a flowchart for explaining an operation of the prior process facility schedule changing means according to the second preferred embodiment.

If the buffer capacity of the next process facility group RGi+1 is exceeded at the process (F1311-8) so that the work start in the facility group RGi is not carried out by the facility scheduling means 1311, the prior process facility schedule changing means 1312 carries out the following processes (F1312-1 and F1312-6), (F1312-1) After the work start in the facility group RGi, the changing means 1312 derives facilities immediately startable in work without lot stay in the buffer of the next process facility group RGi+1 and their work start time t2' in order of earlier time (step 1601 in FIG. 19).

(F1312-2) If no facility immediately startable in work is available (No at step 1602), the process of the prior process facility schedule changing means 1312 is finished as determining that the change of the prior process facility schedule is impossible (step 1606).

(F1312-3) If the immediately startable facility is available (Yes at step 1602), the changing means 1312 derives facility work start times t0' and t1' and a workable facility in the facility group RGi so that a lot can arrive at the next process facility group RGi+1 at t2' (step 1603).

(F1312-4) It is determined whether a buffer of the facility group RGi exceeds the buffer maximum capacity during lot stay in the buffer from an arrival time t0 of the work lot at the facility group RGi to a work start time t0' (step 1604).

(F1312-5) If the buffer capacity is not exceeded (Yes at step 1604), the work schedule in the facility group RGi and the facility group RGi+1 derived up to then are set to be effective (step 1605).

(F1312-6) If the buffer capacity is exceeded (No at step 1604), the work scheduling subsequent to the facility group RGi+1 is stopped.

In FIG. 18, (F1312-1) represents the time t2' at which the work is startable in the facility group RGi+1 without lot stay, (F1312-2) represents the facility immediately startable in work at the time t2'.

(F1312-3) represents the work time t0' and the finish time t1' in the facility group RGi, (F1312-4) represents a check of the lot stay term in the facility group RGi, and (F1312-5) represents that, as a result of the check of the lot stay term in the facility group RGi, the number of lots in the buffers is within the buffer maximum capacity so that the lot stay is possible.

Figure 20:
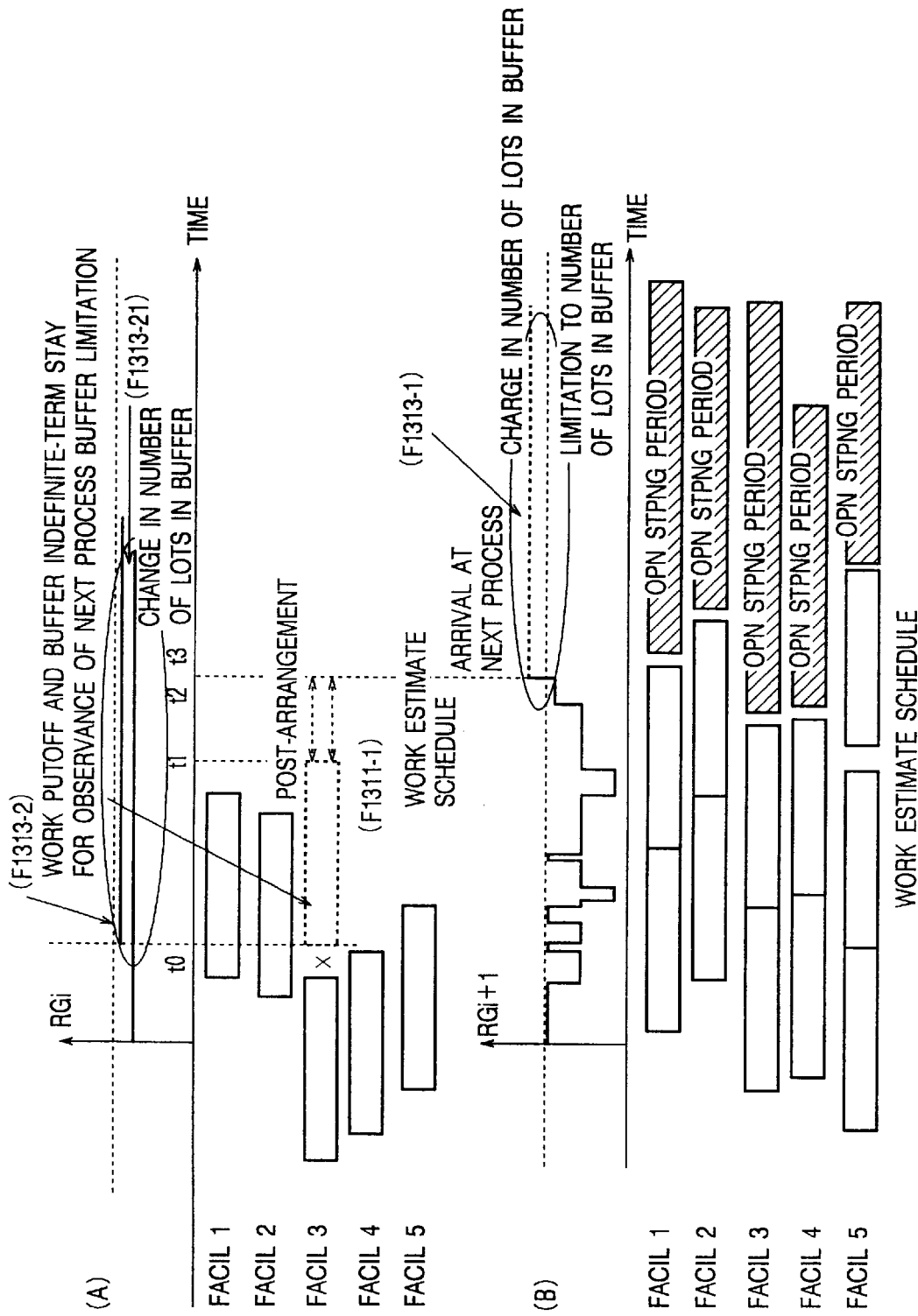
FIG. 20 is a diagram for explaining an example of indefinite-term stay scheduling in a facility group carried out by an indefinite-term stay scheduling means according to a third preferred embodiment of the present invention, and schematically showing that the number of waiting lots in the facility group RGi+1 exceeds the buffer capacity due to the work start in the facility group RGi so that an arrival time of a work lot at the facility group RGi is derived to carry out a determination of indefinite-term stay and, as a result of the determination, the indefinite-term stay in the facility group RGi is possible.

Now, an operation of the indefinite-term stay scheduling means 1313 according to the third preferred embodiment will be explained with reference to FIGS. 20 and 21. FIG. 20 is a diagram schematically showing an example of indefinite-term stay scheduling in the facility group carried out by the indefinite-term stay scheduling means 1313, and FIG. 21 is a flowchart for explaining an example of an operation of the indefinite-term stay scheduling means 1313.

Figure 21:
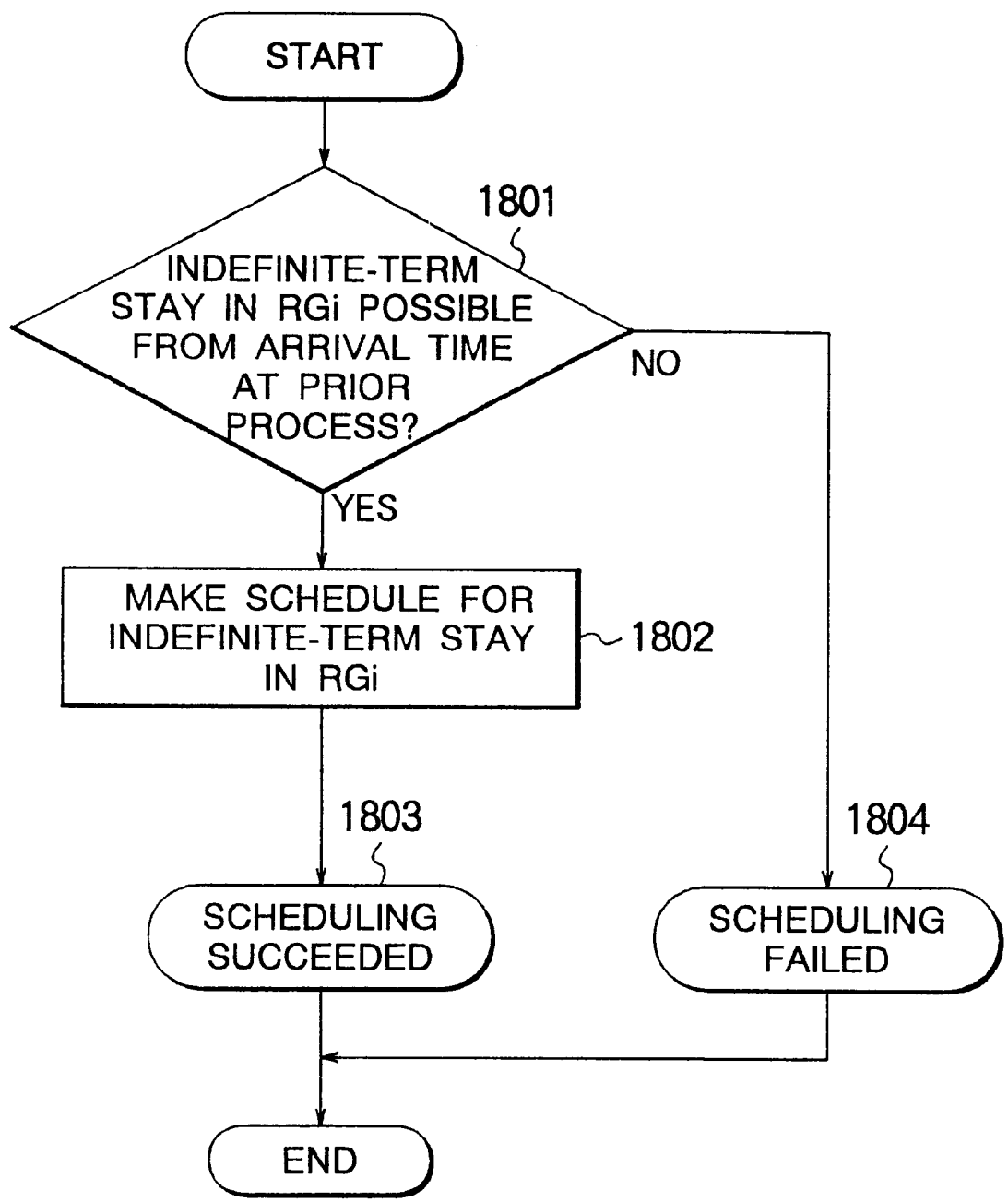
FIG. 21 is a diagram showing a flowchart for explaining an operation of the indefinite-term stay scheduling means according to the third preferred embodiment.

Upon scheduling the lot work in the facility group RGi, the indefinite-term stay scheduling means 1313 carries out the following processes (F1313-1 to F1313-22):

(F1313-1) If the number of waiting lots at the facility group RGi+1 exceeds the buffer capacity so that the scheduling of the lot work in the facility RGi is disabled, or if the work start in the facility group RGi can not be delayed by the prior process facility idle minimum scheduling means 1312 so that the scheduling of the lot work in the facility RGi is disabled, the indefinite-term stay scheduling means 1313, with respect to the work lot, (F1313-2) determines whether the work lot can stay in the buffer of the facility group RGi indefinitely from the arrival time at the facility group RGi (step 1801 in FIG. 21).

(F1313-21) If the lot stay in the buffer is possible (Yes at step 1801), a schedule for indefinite-term stay from the arrival time at the facility group RGi is made, and the work scheduling is finished without carrying out the work scheduling subsequent to the facility group RGi+1 (steps 1802 and 1803).

(F1313-22) If the lot stay in the buffer is not possible (No at step 1801), the work start for the work lot in the facility group RGi is not carried out (step 1804).

In FIG. 20, (F1313-1) represents that the number of waiting lots in the facility group RGi+1 exceeds the buffer capacity due to the work start in the facility group RGi, (F1313-2) represents that the arrival time of the work lot at the facility group RGi is derived to carry out a determination of the indefinite-term stay, and (F1313-21) represents that the indefinite-term stay in the facility group RGi is possible.

After update of the production data, the input/output section 11 produces the lot feed schedule initialization request control signal S20.

The production controller 1 according to the third preferred embodiment includes the initial state setting means 141 in the state setting section 14.

After completion of the initial setting, the production controller 1 produces the lot feed schedule initialization request control signal S20 through the input/output section 11.

In response to the lot feed schedule initialization request control signal S20, the state setting section 14, through the initial state setting means 141, enumerates data about the facility groups satisfying the foregoing condition (1) or (π), the facilities and buffers and, after obtaining data about the external utilities managing them, obtains data about the lots in process in the facilities to be managed.

With respect to these lots, the initial state setting means 141, through the continuous process scheduling means 131 of the scheduling section 13, makes a work schedule per lot, a utilization schedule per facility and a utilization schedule per buffer subsequent to the current process, and stores them in the storage section 15 as a lot schedule time table T1211, a facility schedule time table T1212 and a buffer schedule time table T1213.

Then, the production controller 1 obtains data about the fed lots in the process waiting state in the buffer to be managed. Similar to the above, with respect to these lots, the production controller 1, through the continuous process scheduling means 131 of the scheduling section 13, makes lot schedule time tables T1211, facility schedule time tables T1212 and buffer schedule time tables T1213 subsequent to the current processes and store them in the storage section 15.

With respect to the lots which can not be scheduled for by the foregoing process, schedules for indefinite-term stay from the arrival time are made relative to the current processes of those lots and stored in the storage section 15 as lot schedule time tables T1211 and buffer schedule time tables T1213.

As described above, the production controller 1 according to the third preferred embodiment, through the initial state setting means 141, carries out the work estimate scheduling about the lots in initial process at the start of the operation and stores the lot schedule time tables T1211, the facility schedule time tables T1212 and the buffer schedule time tables T1213 in the storage section 15.

Now, the fourth preferred embodiment of the present invention will be described. In the production controller 1 according to the fourth preferred embodiment, every time the lot schedules T1211, the facilities schedules T1212 and the buffer schedules T1213 are made in the respective processes at (F131-1) and (F131-2), the continuous process scheduling means 131 stores and manages those schedules and, every time partial changes of the schedules are carried out at (F131-2) or the schedules are invalidated at (F131-3), the continuous process scheduling means 131, while invalidating those schedules of the lot schedules T1211, the facility schedules T1212 and the buffer schedules T1213 for managing them, carries out the scheduling for the continuous processes.

As described above, in the production controller 1 according to the fourth preferred embodiment, every time the lot schedules, the facility schedules and the buffer schedules for the respective processes are made, changed and invalidated, they are stored and managed in the schedule storage section which is used upon making the schedules of the facilities and the buffers so that the continuous process scheduling of the job shop line is carried out.

EXAMPLE

For showing concrete effects of the preferred embodiments of the present invention, the results of simulation in which the prediction control of the production controller 1 is applied to the production line model shown in FIG. 2 will be given as examples.

Figure 22:
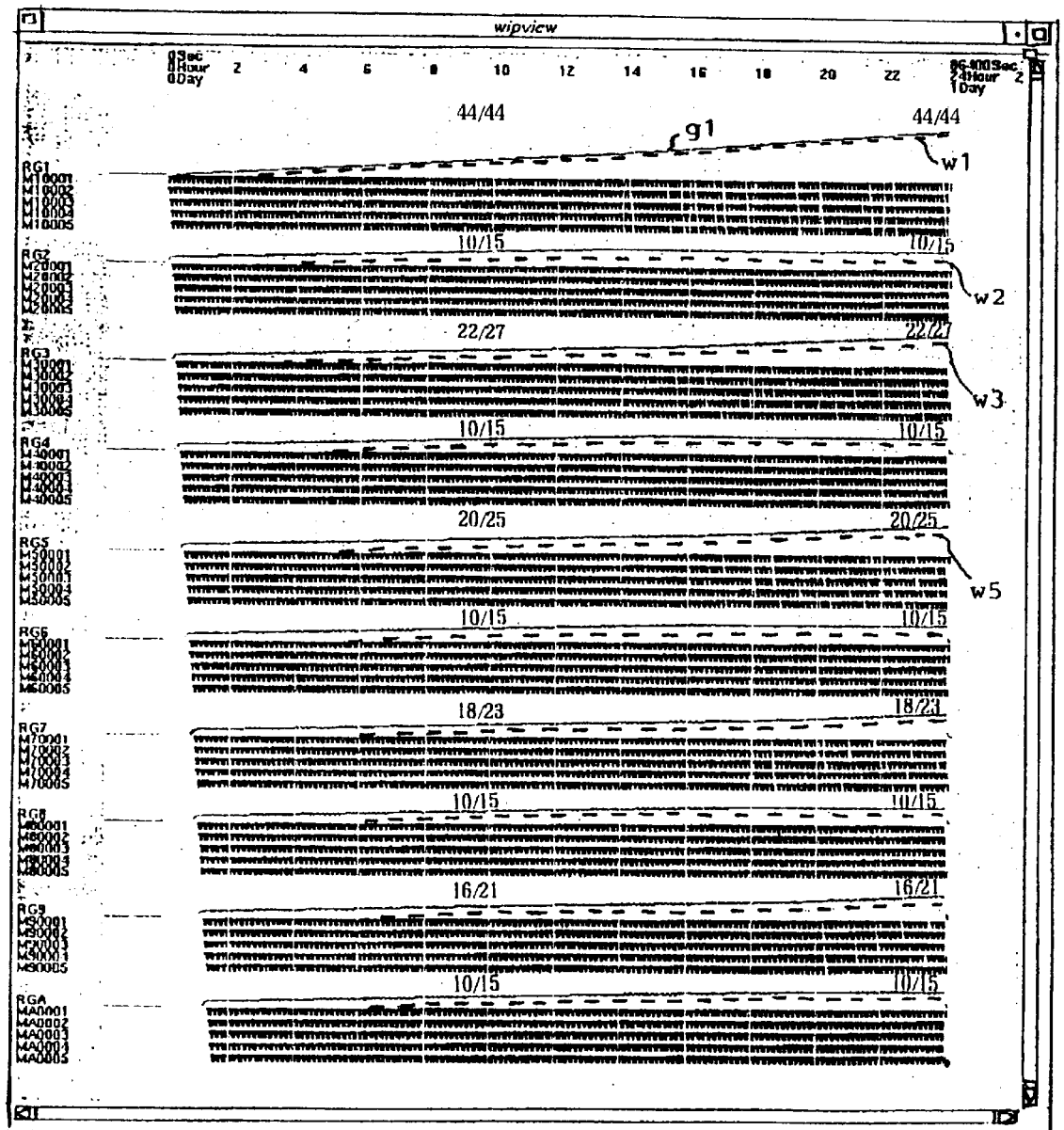
FIG. 22 is a diagram showing the results of simulation in which a flow control by a production controller of the present invention is applied to the simulation model shown in FIG. 2, wherein a predicted process is one process forward.
Figure 23:
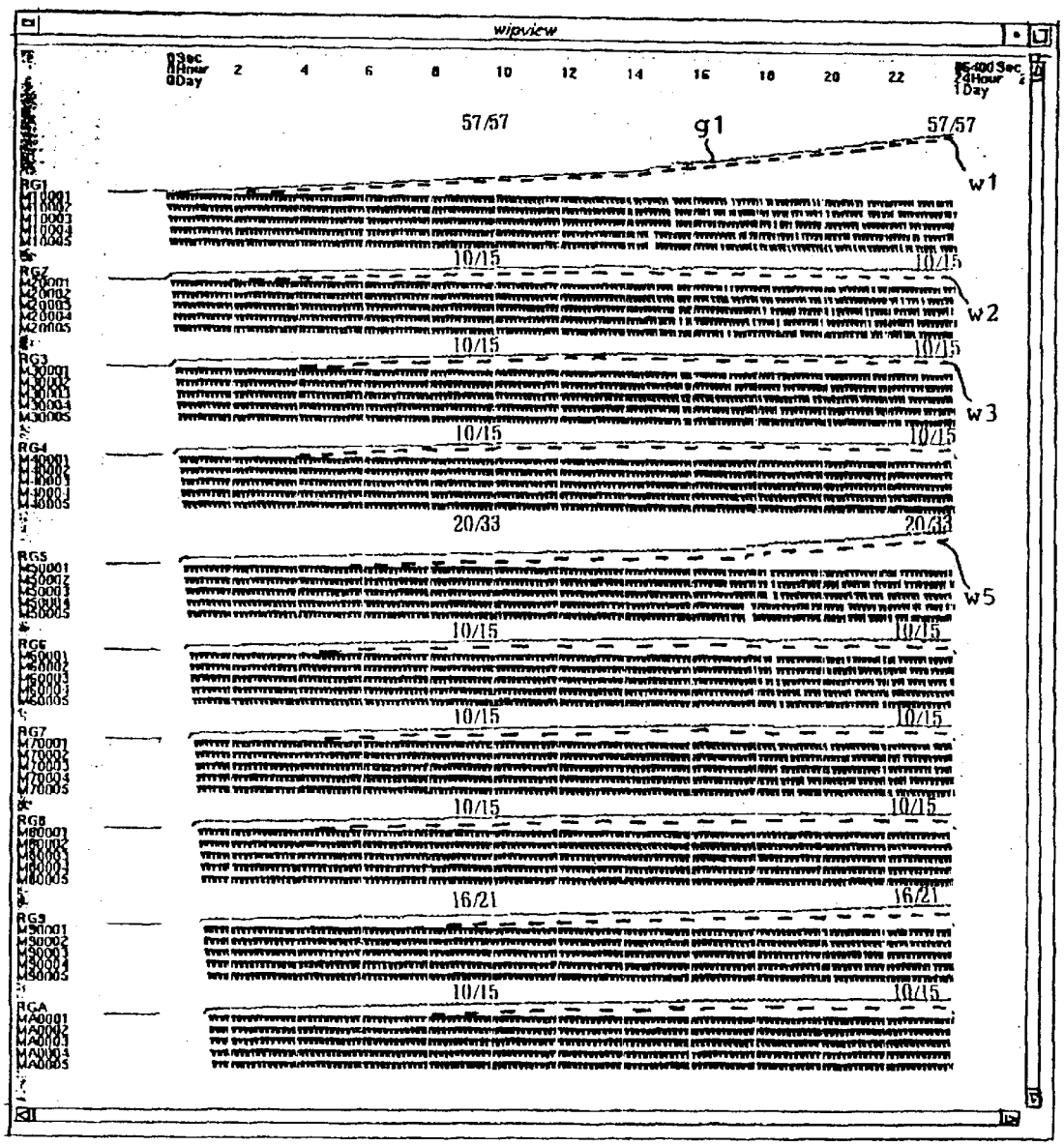
FIG. 23 is a diagram showing the results of simulation in which a flow control by a production controller of the present invention is applied to the simulation model shown in FIG. 2, wherein a predicted process is three processes forward.
Figure 24:
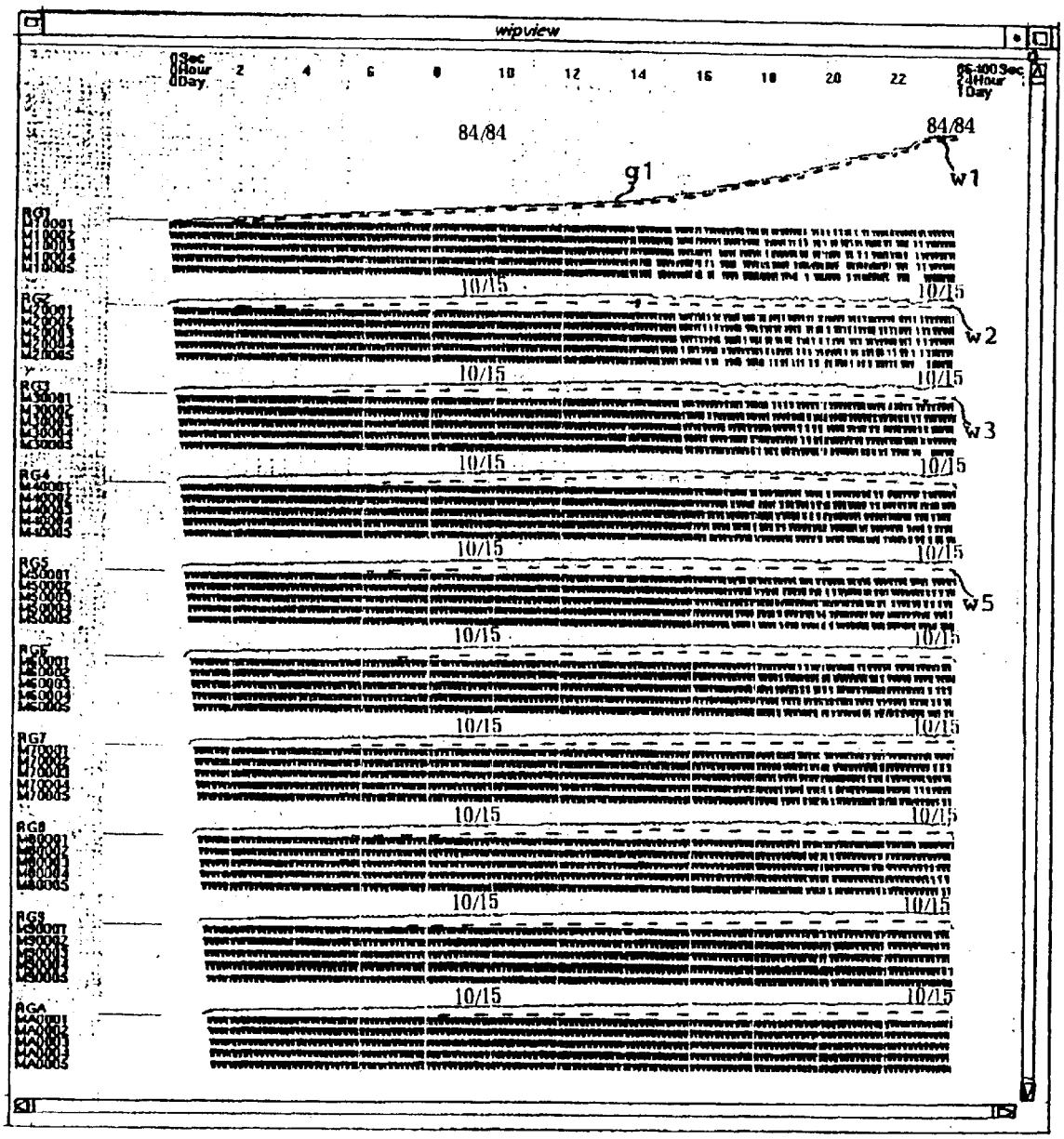
FIG. 24 is a diagram showing the results of simulation in which a flow control by a production controller of the present invention is applied to the simulation model shown in FIG. 2, wherein a predicted process is ten processes forward.

In each of FIGS. 22 to 24, the facility groups are listed from upper to lower in the order of the working procedure.

First, a time-domain variation of the number of waiting lots in the buffer of the facility group is shown by broken line (wl-wA) per facility group while a time-domain variation of the sum of the number of waiting lots and the number of work lots in the prior process is shown by solid line (gl-gA) per facility group.

On the upper-right of each of the solid lines (gl-gA), the maximum value of the number of waiting lots and the maximum value of the sum of the number of waiting lots and the number of work lots in the prior process are indicated in turn.

Subsequently, a work history is shown per facility, wherein work estimate time segments are identified by black rectangles, respectively. Since a work time is small as compared with a time indicating scale, time zones where the work was carried out are indicated as being painted out in black.

In the examples, ten continuous facility groups are subjected to a finite buffer control with the maximum capacity of each of the buffers subsequent to the facility group RG01 being 10 lots.

The lots are fed to the facility group RG01 at regular intervals. If the lot is not immediately processed, it stays in the buffer of RG01 and waits until the work can be started. Accordingly, the number of lots staying in the buffer of RG01 directly reflects the throughput of the whole production line. That is, by the number of lots staying in the buffer of RG01, the throughput evaluation of the production control can be achieved.

FIG. 22 shows the results of simulation applied with a flow control by the production controller according to the present invention, wherein a predicted process is one process forward. Similarly, FIG. 23 shows the results of a flow control in which a predicted process is three processes forward, and FIG. 24 shows the results of a flow control in which a predicted process is ten processes forward.

When the buffer change in each of the facility groups RG03, RG05, RG07 and RG09 in observed in FIG. 22, it is seen that the buffer maximum capacity of 10 lots is exceeded at a certain time point so that the aimed production control can not be achieved.

On the other hand, when the buffer change in each of the facility groups RG05 and RG09 is observed in FIG. 23, it is seen that the buffer change in each of the facility groups RG02 to RG04, RG06 to RG08 and RGA is suppressed to within the buffer maximum capacity, while the buffer maximum capacity of 10 lots is exceeded in each of the facility groups RG5 and RG9.

Further, when FIG. 24 is observed, it is seen that the buffers of all the facility groups are suppressed to within the maximum capacity of 10 lots.

The experimental results shown in FIGS. 22 and 23 clearly show that, as seen in the conventional technique shown in the foregoing Japanese Patent Application No. 6-320310 and the conventional technique shown in the foregoing literature (4) "Modeling Technique of Scheduling Problem Considering Buffer Capacity", when the work start control is performed so as to eliminate the time lag, if the number of the facility groups predicting the lot processing toward the subsequent processes is less than the number of the finite buffer facility groups continuous in the working procedure, the aimed production control can not function, and that only the production control of the present invention can effectively function in the finite buffer facility groups.

Figure 25:
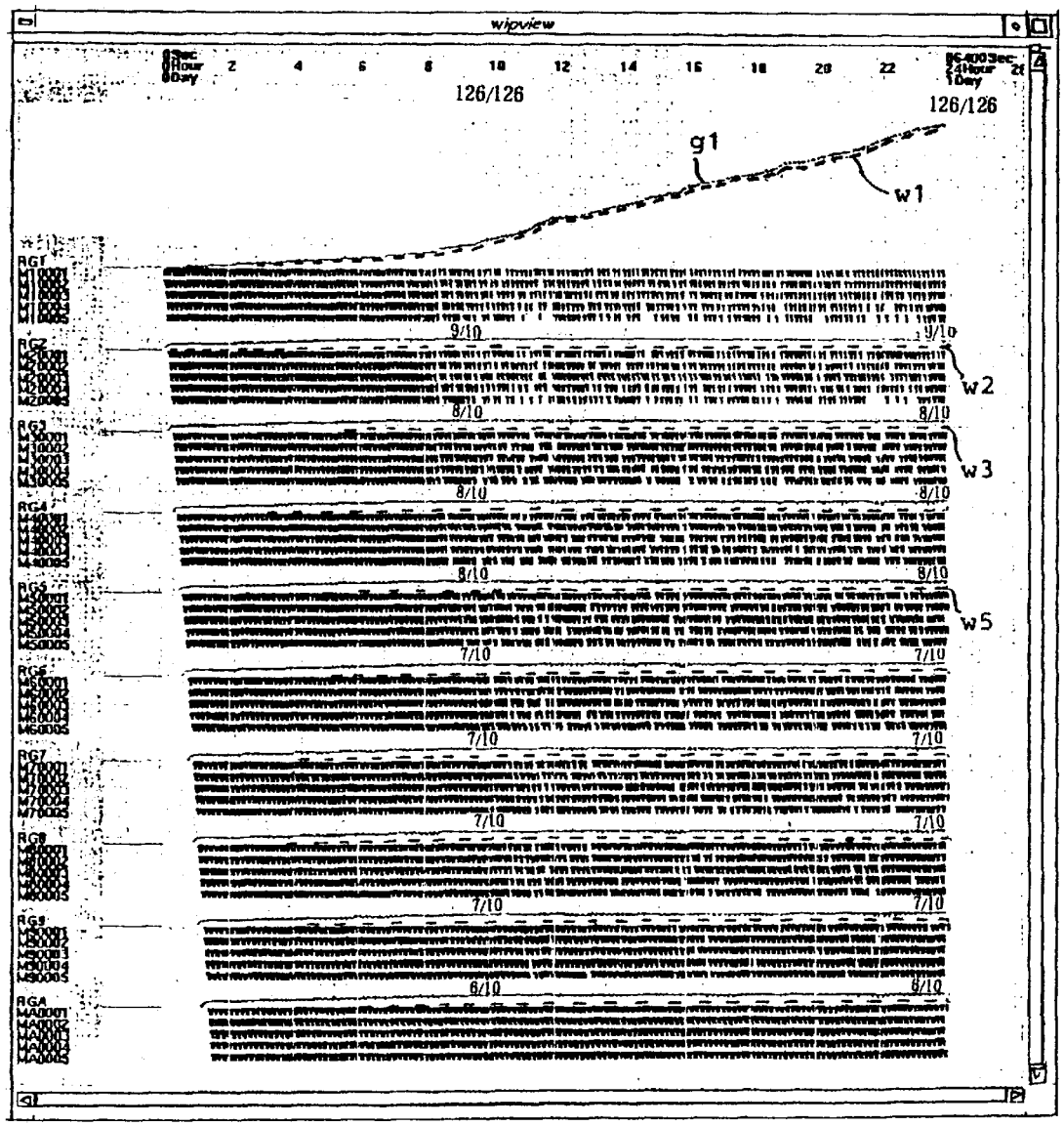
FIG. 25 is a diagram showing the results of simulation in which a conventional flow control described in Japanese patent Application No. 6-320310 as the prior art is applied to the simulation model shown in FIG. 2, as a comparative example.

FIG. 25 shows, as a comparative sample, the results of simulation in which the conventional flow control described in the foregoing Japanese Patent Application No. 6-320310 as the prior art is applied to the simulation model shown in FIG. 3.

When the results shown in FIG. 25 are compared with those in FIG. 23, it is seen that the number of staying lots in the facility group RG01 is greater in FIG. 25 than in FIG. 23, and thus, the throughput of the production control by the production controller according to the present invention is relatively high, meaning that the effective production control is carried out.

For showing other effects of the preferred embodiments of the present invention, the results of simulation are shown wherein, for example, the prediction control of the production controller 1 is applied to the production line shown in FIG. 2.

Figure 26:
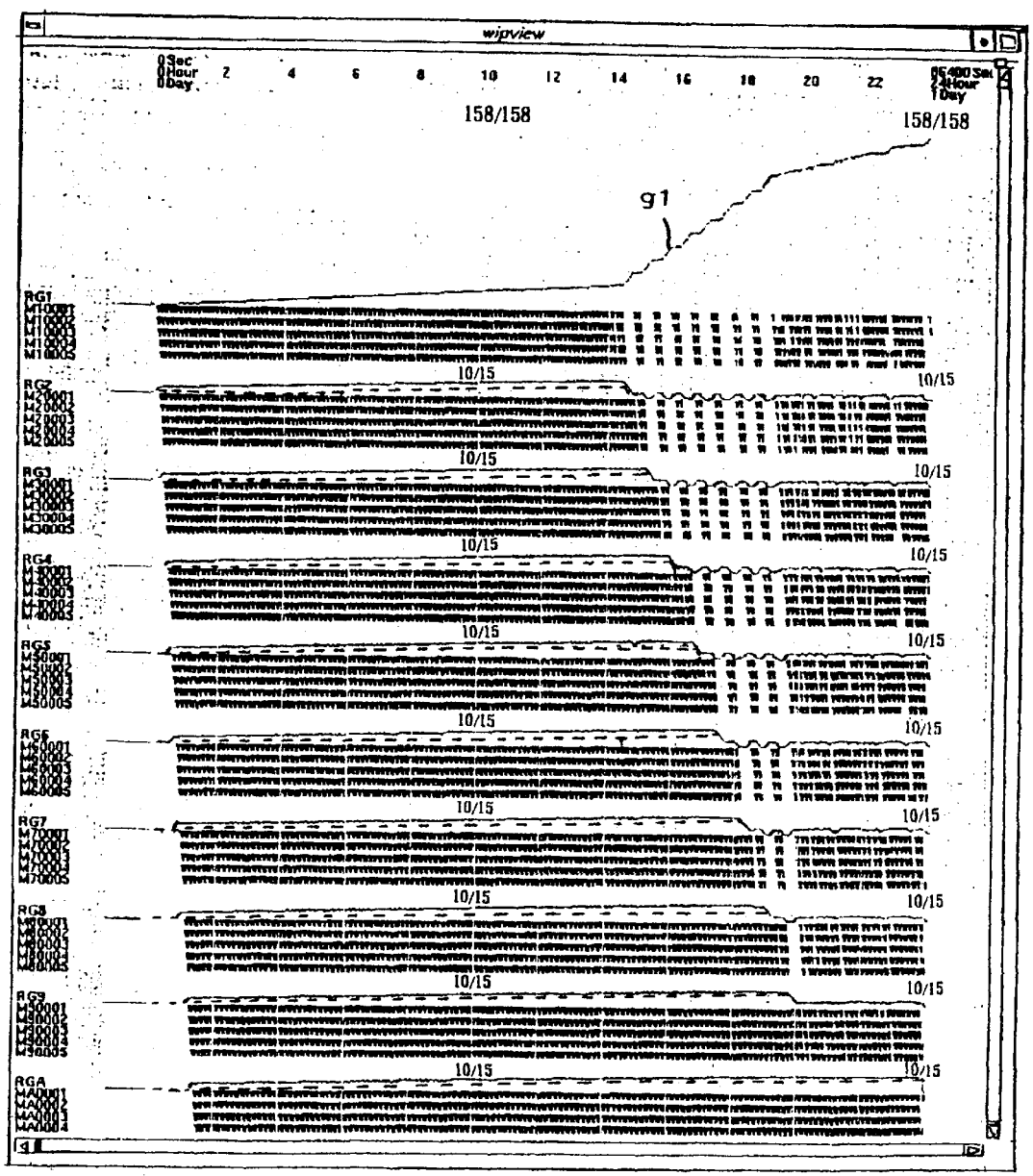
FIG. 26 is a diagram showing the results of simulation, wherein the simulation model shown in FIG. 2 is used, and scheduling is carried out in a lot schedule managing means in which the work start is performed only when work scheduling executable for all the finite buffer facility groups continuous in a working procedure can be achieved.

FIG. 26 shows an example of the results of production control simulation in which the work start is carried out only in case of the foregoing (E-1) in the lot schedule managing means 1211.

FIG. 24 shows an example of the results of production control simulation in which the work start is carried out in case of the foregoing (E-1) and (E-2) in the lot schedule managing means 1211.

When the changes in number of lots in the buffers of the facility groups RG2 to RGA (RG10) are compared between FIGS. 24 and 26, it is seen that, for example, in FIG. 26, as shown in the state past 14 hours of RG2, those time zones are noticeable where the facilities are not operated and the number of waiting lots in the buffer is small so that the production facilities and the buffer are not used effectively.

As a result, it is also shown that the facilities and the buffers of the facility groups subsequent to RG2 are, similarly, not used effectively so that the work progress is not advanced. As a result of this, it is shown that the number of waiting lots in the buffer of the facility group RG1 is increased so that the throughput of the whole line, that is, the production efficiency, is lowered.

This shows that, even if the conventional scheduling technique is used in the continuous finite buffer facility groups, the efficient production control achieved by the production controller 1 as shown in FIG. 24 can not be achieved, and further shows that the production control can function effectively in the finite buffer facility groups only when executed by the production controller 1.

According to the above-mentioned preferred embodiments, the following effects are achieved:

The first effect is that the start control can be carried out so that the number of work waiting lots in the facility group having the finite buffer does not exceed the maximum capacity of the finite buffer. The reason is that the work times in the respective finite buffer facility groups continuous in the working procedure (hereinafter referred to as "continuous block") when the lots in the buffers are immediately subjected to the work start, are estimated in order of the continuous processes in the light of the current and future states of the facilities and the buffers in the facility groups in the continuous block managed by the work start control section and the scheduling section and, after confirming that the work waiting is not caused in the respective facility groups in the continuous block when the lots are immediately subjected to the work start, the work start for the lots based on the work estimate times is carried out.

The second effect is that the resources for production, such as the facilities and the buffers, are used effectively in the production line having the buffer capacity limitation so as to enhance the production efficiency of the production line. The reason is that, when performing the scheduling of the work-object lot in the facility groups to be controlled by the production controller, the work start for the lot is carried out when the conditions of (E-1) the work schedules executable for all the finite buffer facility groups which are continuous in the working procedure can be prepared; and in addition, (E-2) the work schedule executable up to the midway of the continuous finite buffer facility groups and the schedule capable of the indefinite-term stay in the intermediate process can be prepared (the work schedule for the continuous finite buffer facility groups subsequent to the indefinite-term stay process is prepared after the lot actually arrives at the indefinite-term stay facility group and waiting for the state where the scheduling is possible) are satisfied.

The third effect is that the work scheduling is carried out considering the whole of the continuous finite buffer facility groups and the work start is carried out based on such work scheduling so that the work stagnation due to a china of indefinite-term stagnation of the work lots, which may cause a deadlock of the lot flow, can be prevented. The reason is that the lot work start control is executed in the facility groups to be controlled by the production controller in case of the foregoing (E-1) or (E-2).

The fourth effect is that, if there exists a lot in process in the production facility to be controlled, in a process waiting state or on transfer at the start of operation of the production controller, the estimate scheduling necessary for the subsequent production control of the lot is carried out so that the production control of the production system in the foregoing state can be realized.

The fifth effect is that the overlapping use of the facilities and the buffers can be prevented upon the work scheduling in the production line where the same facility groups appear twice or more in the continuous zone of the finite buffer facility groups so that the production controller can be applied to the job shop type production line. The reason is that the schedules prepared in sequence upon the work scheduling of the respective processes are stored and managed and, upon the change or the invalidation of the schedules, the change or the invalidation of the schedules are executed, respectively, so as to reflect them on the schedule management.

While the present invention has been described in terms of the preferred embodiments, the invention is not to be limited thereto, but can be embodied in various ways without departing from the principle of the invention as defined in the appended claims.

What is claimed is:

1. A production controller comprising:

a progress control means for controlling execution of work, based on a lot work estimate schedule predetermined by scheduling, relative to a lot arrived at each of finite buffer facility groups where the number of lots to be accommodated in a corresponding buffer is limited, and for controlling work to be executed next, based on a predetermined facility schedule, relative to a lot to be processed next in a facility which has finished processing a lot;

a lot schedule managing means for storing and managing, for each of the lots existing in the finite buffer facility groups that operate continuously in a working procedure, the lot work estimate schedule in the continuous finite buffer facility groups;

a facility schedule managing means for storing and managing an operation stopping estimate schedule and a work estimate schedule for reach of facilities of the continuous finite buffer facility groups;

a buffer schedule managing means for storing and managing a buffer utilization estimate schedule for each of the finite buffer facility groups; and a continuous process scheduling means for making, relative to a lot entering a continuous zone of the continuous finite buffer facility groups or a lot whose work estimate schedule is undetermined from a midway in the continuous zone, a work schedule for the lot in the continuous zone or a schedule for the lot to indefinitely stay on the midway, wherein the work start in each of the facilities of the facility groups in the working procedure are controlled such that the number of the lots waiting for work before each corresponding facility group is held within a buffer capacity of the corresponding facility group.

2. A production controller for controlling a lot flow of a production line including a plurality of finite buffer facility groups, said production controller comprising:

a lot schedule managing means for storing and managing in a storage section, for each of the lots existing in the finite buffer facility groups that operate continuously in a working procedure, a work estimate schedule in the continuous finite buffer facility groups;

a facility schedule managing means for storing and managing in the storage section an operation stopping estimate schedule and a work estimate for each of the facilities of the continuous finite buffer facility groups;

a buffer schedule managing means for storing and managing in the storage section a buffer utilization estimate schedule for each of the finite buffer facility groups;

a continuous process scheduling means for making, relative to a lot entering a continuous zone of the continuous finite buffer facility groups or a lot whose work estimate schedule is undetermined from a midway in the continuous zone, the undetermined work schedule for the lot in the continuous zone or a schedule for the lot to indefinitely stay on the midway;

a progress control means for controlling execution of work, based on the lot work estimate schedule predetermined by the continuous process scheduling means, relative to a lot arrived at each of the finite buffer facility groups where the number of the lots to be accommodated in a corresponding buffer is limited, and for controlling work to be executed next, based on a predetermined facility schedule, relative to a lot to be processed next in the facility which has finished a lot process; and a schedule correcting means for, upon occurrence of a discrepancy between the schedule made by the continuous process scheduling means and an actual schedule, correcting the discrepancy of the made schedule according to the actual schedule;

wherein the production controller controls a work start for each lot such that the number of lots waiting for work before each of the corresponding facility groups do not exceed a respective buffer capacity for storing waiting lots.

3. A production controller as claimed in claim 2, wherein said continuous process scheduling means comprises:

a facility idle minimum scheduling means for selecting a work facility and a work time so as to minimize an idle stopping period of each of the facilities for carrying out lot work scheduling for each of the facilities and utilization scheduling for each of the buffers;

a prior process facility schedule changing means for changing a work time segment in the facility group of a prior process to a work time segment where the work can be carried out after a designated time; and an indefinite-term stay scheduling means for indefinitely staying a corresponding lot in the designated facility group.

4. A production controller as claimed in claim 2, further comprising an initial state setting means for, when the initial process lots exist on the production line, obtaining data about production planning, the production line and the process lots from an external device upon an initial operation, and for making and setting a lot schedule time table for each of the lots in initial process subsequent to a start time of a production control, a facility schedule time table for each of the facilities and a buffer schedule time table for each of the buffers, so as to be set ready for the production control.

5. A production controller as claimed in claim 2, wherein the continuous process scheduling means makes the lot schedules, the facility schedules and the buffer schedules of all processes in the continuous zone of the continuous finite buffer facility groups by storing the lot schedule, the facility schedule and the buffer schedule every time the schedules of each of the processes are provisionally determined and by carrying out change or invalidation every time each of the schedules is partly changed or invalidated.

6. A production controller comprising:

a lot schedule managing unit for managing a first work estimate schedule for each of lots existing in finite buffer facility groups that operate continuously in a working procedure;

a facility schedule managing unit for managing an operation stopping estimate schedule and a second work estimate schedule for each of the facilities of said finite buffer facility groups;

a buffer schedule managing unit for managing a utilization estimate schedule for each of said finite buffer facility groups;

a continuous process scheduling unit connected to said lot schedule managing unit, said facility schedule managing unit, and said buffer schedule managing unit for scheduling, with reference to said first work estimate schedule, said operation stopping estimate schedule, said second work estimate schedule, and said utilization estimate schedule, a third work estimate schedule for the lots put in a continuous zone of said finite buffer facility groups; and a progress control unit connected to said continuous process scheduling unit for controlling, with reference to said third work estimate schedule, execution of the work relative to the lots arrived at said finite buffer facility groups, wherein the production controller controls a work start for a lot so that a number of waiting lots before each corresponding facility group does not exceed a capacity of a corresponding buffer which stores the waiting lots in each of said finite buffer facility groups.

* * * * *